(12) United States Patent
Matsunobu et al.

(10) Patent No.: US 12,249,027 B2
(45) Date of Patent: Mar. 11, 2025

(54) THREE-DIMENSIONAL MODEL GENERATION METHOD, INFORMATION PROCESSING DEVICE, AND MEDIUM

(71) Applicant: Panasonic Intellectual Property Management Co., Ltd., Osaka (JP)

(72) Inventors: Toru Matsunobu, Osaka (JP); Satoshi Yoshikawa, Hyogo (JP); Masaki Fukuda, Osaka (JP); Kensho Teranishi, Osaka (JP); Pradit Mittrapiyanuruk, Singapore (SG); Keng Liang Loi, Singapore (SG); Pongsak Lasang, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 85 days.

(21) Appl. No.: 17/746,190

(22) Filed: May 17, 2022

(65) Prior Publication Data

US 2022/0277516 A1 Sep. 1, 2022

Related U.S. Application Data

(63) Continuation of application No. PCT/JP2020/047575, filed on Dec. 18, 2020.

(30) Foreign Application Priority Data

Jan. 10, 2020 (JP) .................................. 2020-002517

(51) Int. Cl.
*G06T 17/00* (2006.01)
*G01B 11/26* (2006.01)
(Continued)

(52) U.S. Cl.
CPC .............. *G06T 17/00* (2013.01); *G01B 11/26* (2013.01); *G01S 7/4865* (2013.01); *G01S 17/86* (2020.01);
(Continued)

(58) Field of Classification Search
CPC ......... G06T 17/00; G06T 3/4007; G06T 7/90; G06T 7/70; G06T 19/00;
(Continued)

(56) References Cited

U.S. PATENT DOCUMENTS

| 10,353,397 B2 * | 7/2019 | Nakaya | ............... G01C 21/3848 |
| 2003/0035917 A1 * | 2/2003 | Hyman | ................... B41M 5/36 |
| | | | 524/106 |

(Continued)

FOREIGN PATENT DOCUMENTS

| JP | 2010-96752 | 4/2010 |
| JP | 2015-87319 | 5/2015 |

(Continued)

OTHER PUBLICATIONS

International Search Report issued Mar. 2, 2021 in International (PCT) Application No. PCT/JP2020/047575.

(Continued)

*Primary Examiner* — Wesner Sajous
(74) *Attorney, Agent, or Firm* — Wenderoth, Lind & Ponack, L.L.P.

(57) ABSTRACT

A three-dimensional model generation method executed by an information processing device includes: obtaining a first three-dimensional model from a measuring device that emits an electromagnetic wave and obtains a reflected wave which is the electromagnetic wave reflected by a measurement target to thereby generate a first three-dimensional model including first position information indicating first three-dimensional positions in the measurement target; obtaining (Continued)

a multi-viewpoint image generated by one or more cameras shooting the measurement target from different positions; and generating a second three-dimensional model by enhancing the definition of the first three-dimensional model using the multi-viewpoint image.

11 Claims, 17 Drawing Sheets

(51) Int. Cl.
  *G01S 7/48*     (2006.01)
  *G01S 7/4865*   (2020.01)
  *G01S 17/86*    (2020.01)
  *G01S 17/89*    (2020.01)
  *G06T 3/40*     (2024.01)
  *G06T 3/4007*   (2024.01)
  *G06T 7/70*     (2017.01)
  *G06T 7/90*     (2017.01)
  *G06T 19/00*    (2011.01)

(52) U.S. Cl.
  CPC ............ *G01S 17/89* (2013.01); *G06T 3/4007* (2013.01); *G06T 7/70* (2017.01); *G06T 7/90* (2017.01); *G06T 19/00* (2013.01); *G06T 2200/08* (2013.01); *G06T 2207/10024* (2013.01)

(58) Field of Classification Search
  CPC ....... G06T 2207/10024; G06T 2200/08; G01S 17/86; G01S 17/89; G01S 17/42; G01S 17/08; G01S 17/894; G01S 17/46; G01S 17/10; G01S 7/4865; G01S 7/4814; G01C 3/06; G01C 3/085; G01C 15/00; G01C 11/06; G01B 11/26
  See application file for complete search history.

(56) References Cited

U.S. PATENT DOCUMENTS

| | | | |
|---|---|---|---|
| 2008/0247670 A1* | 10/2008 | Tam | G06T 7/50 348/51 |
| 2017/0324944 A1* | 11/2017 | Nakajima | H04N 13/363 |
| 2018/0089846 A1* | 3/2018 | Wohlfeld | G01S 7/497 |
| 2018/0275278 A1* | 9/2018 | Yamada | G01C 3/085 |
| 2019/0391244 A1 | 12/2019 | Sekiguchi et al. | |
| 2022/0107502 A1* | 4/2022 | Robaina | B60K 35/00 |
| 2022/0283211 A1* | 9/2022 | Tanimoto | G01R 29/0878 |

FOREIGN PATENT DOCUMENTS

| | | |
|---|---|---|
| JP | 2019-66186 | 4/2019 |
| JP | 2020-3236 | 1/2020 |
| WO | 2012/053521 | 4/2012 |
| WO | 2018/042801 | 3/2018 |

OTHER PUBLICATIONS

Extended European Search Report issued May 30, 2023 in corresponding European Patent Application No. 20912832.1.

* cited by examiner

THREE-DIMENSIONAL MODEL GENERATION METHOD, INFORMATION PROCESSING DEVICE, AND MEDIUM

CROSS REFERENCE TO RELATED APPLICATIONS

This is a continuation application of PCT International Application No. PCT/JP2020/047575 filed on Dec. 18, 2020, designating the United States of America, which is based on and claims priority of Japanese Patent Application No. 2020-002517 filed on Jan. 10, 2020. The entire disclosures of the above-identified applications, including the specifications, drawings and claims are incorporated herein by reference in their entirety.

FIELD

The present disclosure relates to a three-dimensional model generation method, an information processing device, and a program.

BACKGROUND

Patent Literature (PTL) 1 discloses a three-dimensional shape measuring device that obtains a three-dimensional shape using a three-dimensional laser scanner.

CITATION LIST

Patent Literature

PTL 1: Japanese Unexamined Patent Application Publication No. 2015-87319

SUMMARY

Technical Problem

In the generating of three-dimensional models, there is a demand for an improvement in the generating of three-dimensional models.

The present disclosure provides a three-dimensional model generation method, etc., that realizes an improvement in the generating of three-dimensional models.

Solution to Problem

A three-dimensional model generation method according to an aspect of the present disclosure is a three-dimensional model generation method executed by an information processing device and includes: obtaining a first three-dimensional model generated by a measuring device that emits an electromagnetic wave and obtains a reflected wave which is the electromagnetic wave reflected by a measurement target, the first three-dimensional model including first position information indicating first three-dimensional positions in the measurement target; obtaining a multi-viewpoint image generated by one or more cameras shooting the measurement target from different positions; and generating a second three-dimensional model of the measurement target based on the multi-viewpoint image and the first three-dimensional model.

An information processing device according to an aspect of the present disclosure includes: a receiver configured to receive: a first three-dimensional model generated by a measuring device that emits an electromagnetic wave and obtains a reflected wave which is the electromagnetic wave reflected by a measurement target, the first three-dimensional model including first position information indicating first three-dimensional positions in the measurement target; and a multi-viewpoint image generated by one or more cameras shooting the measurement target from different positions; and a processor configured to generate a second three-dimensional model of the measurement target based on the multi-viewpoint image and the first three-dimensional model.

It should be noted that the present disclosure may be implemented as a program that causes a computer to execute the steps included in the three-dimensional model generation method described above. Furthermore, the present disclosure may be implemented as a non-transitory computer-readable medium, such as a CD-ROM, having the above program recorded thereon. Furthermore, the present disclosure may be implemented as information, data, or signal representing the above program. In addition, the program, information, data, and signal may be distributed via a communication network such as the Internet.

Advantageous Effects

The present disclosure can provide a three-dimensional model generation method, etc., that realizes an improvement in the generating of three-dimensional models.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Circumstances Leading to the Present Disclosure

Figure 1:
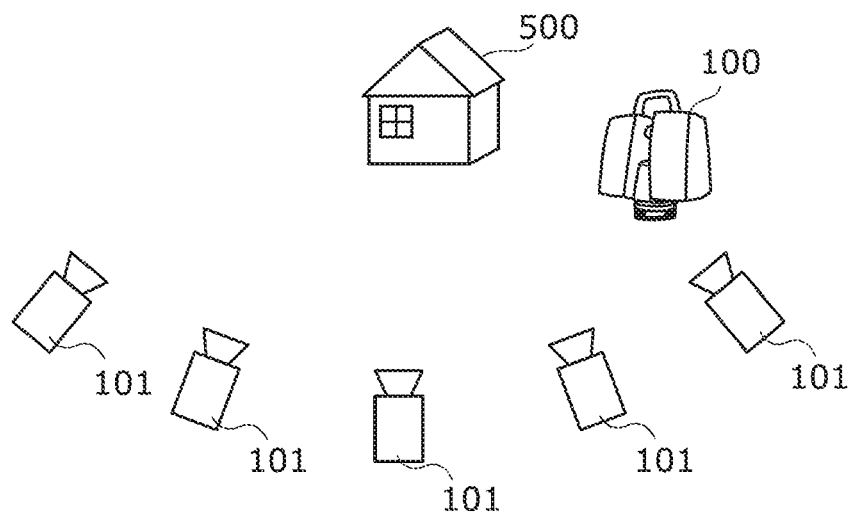
FIG. 1 is a diagram for describing an outline of a three-dimensional model generation method according to an embodiment.

In conventional techniques, such as Patent Literature 1, three-dimensional measurement of a measurement target, such as a cultural heritage and an infrastructure structure, is performed by using a three-dimensional laser measuring device of the Time Of Flight (TOF) system or the phase difference system. A three-dimensional model generated by the three-dimensional laser measuring device includes three-dimensional point cloud data in which the three-dimensional shape of the measurement target is represented by a group of three-dimensional points. Additionally, when a camera is built in the three-dimensional laser measuring device, the three-dimensional model further includes the color information indicating the color of the measurement target in each three-dimensional point based on an image generated by shooting with a camera.

When three-dimensional digitization with high reproducibility is required for the measurement target such as a cultural heritage, a stationary three-dimensional laser measuring device (for example, a 3D scanner) that can obtain a high-density three-dimensional point cloud is used. Additionally, when extensive three-dimensional digitization is required, such as for road infrastructure, a mobile three-dimensional laser measuring device (for example, a LiDAR) that can obtain a three-dimensional point cloud at high speed is used.

Such a three-dimensional laser measuring device requires a lot of time for obtaining a highly accurate and high density three-dimensional point cloud. Additionally, since an image generated by shooting with the camera built in the three-dimensional laser measuring device does not have a sufficient resolution as compared with highly accurate and high density three-dimensional points, the accuracy of the color information corresponding to each three-dimensional point is not enough.

Additionally, since the three-dimensional laser measuring device radially irradiates laser light, the farther away from the measurement target, the lower the density of a three-dimensional point cloud obtained as a measurement result of the measurement target. Thus, in order to obtain a high density three-dimensional point cloud, measurement from a position close to the measurement target is required. Therefore, in order to obtain a high density three-dimensional point cloud, the larger the size of the measurement target, measurement from the more positions around the measurement target is required. However, since the three-dimensional laser measuring device has a heavy weight and is inconvenient to carry, it takes more time to install the three-dimensional laser measuring device at many positions around the measurement target. Additionally, even when a plurality of three-dimensional laser measuring devices are used, a plurality of means for moving the plurality of three-dimensional laser measuring devices are required. As described above, it is difficult to obtain a highly accurate and high density three-dimensional point cloud using the three-dimensional laser measuring device.

Additionally, as another conventional technique for generating a three-dimensional model, it is known to use a multi-viewpoint image generated by a camera shooting a subject from a plurality of viewpoints. Generally, the image generated by shooting with the camera used in this conventional technique has a higher resolution than an image generated by shooting with the camera built in the three-dimensional laser measuring device. That is, the image generated by shooting with the camera used in this conventional technique has a high definition (high accuracy) for the color information of the subject. Additionally, this conventional technique may use a multi-viewpoint image obtained by continuously shooting the subject while moving the camera. Such continuous shooting has a shorter processing time compared with repeating movement of the three-dimensional laser measuring device and measurement. In addition, the camera used in this conventional technique has a higher portability compared with the three-dimensional laser measuring device. For example, a camera can be provided in a mobile body that moves on the ground, or in a flying object. Accordingly, since the camera used in this conventional technique has high portability, it is possible to shoot the subject from all directions. Additionally, this conventional technique that generates a three-dimensional model based on a multi-viewpoint image can accurately generate a three-dimensional model even for a subject that does not easily reflect laser.

In view of this, the present disclosure provides a three-dimensional model generation method, etc., that realizes an improvement in the generating of three-dimensional models.

A three-dimensional model generation method according to an aspect of the present disclosure is a three-dimensional model generation method executed by an information processing device and includes: obtaining a first three-dimensional model generated by a measuring device that emits an electromagnetic wave and obtains a reflected wave which is the electromagnetic wave reflected by a measurement target, the first three-dimensional model including first position information indicating first three-dimensional positions in the measurement target; obtaining a multi-viewpoint image generated by one or more cameras shooting the measurement target from different positions; and generating a second three-dimensional model of the measurement target based on the multi-viewpoint image and the first three-dimensional model.

For example, in a case where a camera is built in a measuring device, and the color information indicating the color of a measurement target in included in the first three-dimensional model, when one or more cameras with higher resolution than that of the built-in camera are used, the second three-dimensional model can be generated by enhancing the definition of the color information included in the first three-dimensional model with the use of the color information of the multi-viewpoint image. Additionally, for example, when the second three-dimensional model is generated by creating a three-dimensional model of only a part of the measurement target requiring a high accuracy for geometry information using a measuring device, and creating a three-dimensional model of the other part of the measurement target using a multi-viewpoint image, the processing time can be reduced than creating a three-dimensional model of the entire measurement target with the measuring device. In addition, for example, even when there is a part on the measurement target that does not easily reflect electromagnetic waves, the second three-dimensional model can be generated by interpolation at a three-dimensional position calculated from the multi-viewpoint image. Further, the second three-dimensional model of the measurement target can also be generated by, for example, generating a third three-dimensional model based on the multi-viewpoint image, and enhancing the definition of second geometry information indicating a plurality of positions of the measurement target included in the third three-dimensional model with first geometry information.

In this manner, by combining the advantages of the measuring device and the advantages of the camera, the three-dimensional model generation method according to an aspect of the present disclosure can realize an improvement in the generating of a three-dimensional model.

Note that, although increasing the accuracy of the color information in the present disclosure means increasing accuracy using a high resolution image, it does not mean using a high resolution image with an expanded imaged region (angle of view). For example, when a three-dimensional model is divided into a plurality of areas, and the color information is assigned to each of the areas, enhancing the definition of the color information in the present disclosure means assigning the color information in a finer unit by increasing the number of the areas.

Additionally, enhancing the definition of geometry information in the present disclosure means increasing the density of positions that can be represented with a three-dimensional model, specifically, increasing the number of positions on the measurement target indicated by the three-dimensional model. Further, enhancing the definition of geometry information in the present disclosure also means increasing the accuracy of positions on the measurement target indicated by the three-dimensional model.

In the present disclosure, enhancing the definition of a three-dimensional model means at least one of enhancing the definition of color information, or enhancing the definition of geometry information.

Furthermore, in the generating, the second three-dimensional model may be generated by: generating a third three-dimensional model using the multi-viewpoint image; identifying a first positional relationship between the first three-dimensional model and the multi-viewpoint image by matching a three-dimensional coordinate axis of the first three-dimensional model and a three-dimensional coordinate axis of the third three-dimensional model; and enhancing the definition of the first three-dimensional model using the first positional relationship identified and the multi-viewpoint image.

Therefore, since the definition of the first three-dimensional model is enhanced by using the multi-viewpoint image whose first positional relationship with the first three-dimensional model has been identified, the definition of the first three-dimensional model can be more effectively enhanced.

Furthermore, in the generating, the second three-dimensional model may be generated by adding, for each of the first three-dimensional positions, second color information as color information corresponding to the first three-dimensional position, using the first positional relationship and the multi-viewpoint image, the second color information being based on a pixel of the multi-viewpoint image which corresponds to the first three-dimensional position.

Therefore, by using the multi-viewpoint image whose positional relationship with the first three-dimensional model has been identified, highly accurate color information can be added to the first three-dimensional model.

Furthermore, the first three-dimensional model further includes items of first color information each indicating a color of the measurement target in a different one of the first three-dimensional positions, the first color information being generated using an image of the measurement target shot by the measuring device. Each of images included in the multi-viewpoint image is an image having a resolution higher than a resolution of the image shot by the measuring device. In the generating, the second three-dimensional model is generated by changing, for each of the first three-dimensional positions, the item of first color information corresponding to the first three-dimensional position to an item of second color information which is based on a pixel of the multi-viewpoint image which corresponds to the first three-dimensional position, using the first positional relationship and the multi-viewpoint image.

Therefore, the first color information of the first three-dimensional model can be changed into the second color information having higher accuracy than the first color information, by using the multi-viewpoint image whose first positional relationship with the first three-dimensional models has been identified.

Furthermore, in the generating, the second three-dimensional model may be generated by interpolating, using the first positional relationship and the multi-viewpoint image, a second three-dimensional position which is between two or more positions included in the first three-dimensional positions in the measurement target, the second three-dimensional model including the first three-dimensional positions and the second three-dimensional position interpolated.

Accordingly, a three-dimensional position between two or more first three-dimensional positions of the first three-dimensional model can be interpolated by using a multi-viewpoint image whose first positional relationship with the first three-dimensional model has been identified. Therefore, it is possible to generate a second three-dimensional model obtained by densification of the first three-dimensional model.

Furthermore, in the generating, the second three-dimensional model may be generated by detecting a defective portion of the first position information and interpolating a third three-dimensional position in the measurement target corresponding to the defective portion interpolated, using the first positional relationship and the multi-viewpoint image, the second three-dimensional model including the first three-dimensional positions and the third three-dimensional position interpolated.

Accordingly, even when a defective part is generated in the first three-dimensional model due to occlusion or the like at the time of measurement with the measuring device, the three-dimensional position of the defective part of the first three-dimensional model can be interpolated by using the multi-viewpoint image whose first positional relationship with the first three-dimensional model has been identified.

Furthermore, in the generating, the second three-dimensional model is generated by: generating a third three-dimensional model using the multi-viewpoint image; and enhancing definition of the third three-dimensional model using the first three-dimensional model.

Furthermore, the dimensional model generation method further includes obtaining (i) an identified image for which a second positional relationship with the first three-dimensional model is identified and (ii) the second positional relationship. In the generating, the second three-dimensional model is generated by: generating a third three-dimensional model using the multi-viewpoint image and the identified image; identifying a first positional relationship between the first three-dimensional model and the multi-viewpoint image, using the third three-dimensional model and the second positional relationship; and enhancing the definition of the first three-dimensional model using the first positional relationship identified and the multi-viewpoint image.

According to this, the first positional relationship between the first three-dimensional model and the multi-viewpoint image can be easily identified by generating the third three-dimensional model by using the multi-viewpoint image as well as the identified image whose second positional relationship with the measuring device has already been identified.

Furthermore, an information processing device according to an aspect of the present disclosure includes: a first obtainer that obtains a first three-dimensional model generated by a measuring device that emits an electromagnetic wave and obtains a reflected wave which is the electromagnetic wave reflected by a measurement target, the first three-dimensional model including first position information indicating first three-dimensional positions in the measurement target; a second obtainer that obtains a multi-viewpoint image generated by one or more cameras shooting the measurement target from different positions; and a generator that generates a second three-dimensional model of the measurement target based on the multi-viewpoint image and the first three-dimensional model.

By combining the advantages of the measuring device and the advantages of the camera, the three-dimensional model generation method according to an aspect of the present disclosure can realize an improvement in the generating of a three-dimensional model.

It should be noted that the present disclosure may be implemented as a program that causes a computer to execute the steps included in the three-dimensional model generation method described above. Furthermore, the present disclosure may be implemented as a non-transitory computer-readable medium, such as a CD-ROM, having the above program recorded thereon. Furthermore, the present disclosure may be implemented as information, data, or signal representing the above program. In addition, the program, information, data, and signal may be distributed via a communication network such as the Internet.

Hereinafter, respective embodiments of a three-dimensional model generation method, etc., according to the present disclosure will be described in detail with reference to the drawings. It should be noted that each of the subsequently described embodiments shows a specific example of the present disclosure. Accordingly, numerical values, shapes, materials, structural components, the arrangement and connection of the structural components, steps, and the processing order of the steps, etc., shown in each of the following embodiments are merely examples, and are therefore not intended to limit the scope of the present disclosure.

Furthermore, the respective figures are not necessarily precise illustrations. In the figures, structural components that are substantially the same are assigned the same reference signs, and overlapping description thereof may be omitted or simplified.

EMBODIMENT

[Outline]

First, referring to FIG. 1, the outline of a three-dimensional model generation method according to an embodiment will be described.

FIG. 1 is a diagram for describing the outline of the three-dimensional model generation method according to the embodiment.

In the three-dimensional model generation method, as shown in FIG. 1, a three-dimensional model of measurement target 500 is generated from images shot from different viewpoints by using measuring device 100 and cameras 101. Measurement target 500 may be a static object, such as a building and an infrastructure structure. Additionally, measurement target 500 may include a moving body in addition to the static object. For example, when the space where measurement target 500 exists is the space on a road, the moving body is a person or a vehicle that moves in the space. In addition, for example, when the space where measurement target 500 exists is a sports venue, the moving body is a sports athlete, a sports gear owned by the athlete, an audience, or the like. Note that measurement target 500 may include not only a specific object but also scenery or the like. In FIG. 1, a case where measurement target 500 is a building is illustrated.

Figure 2:
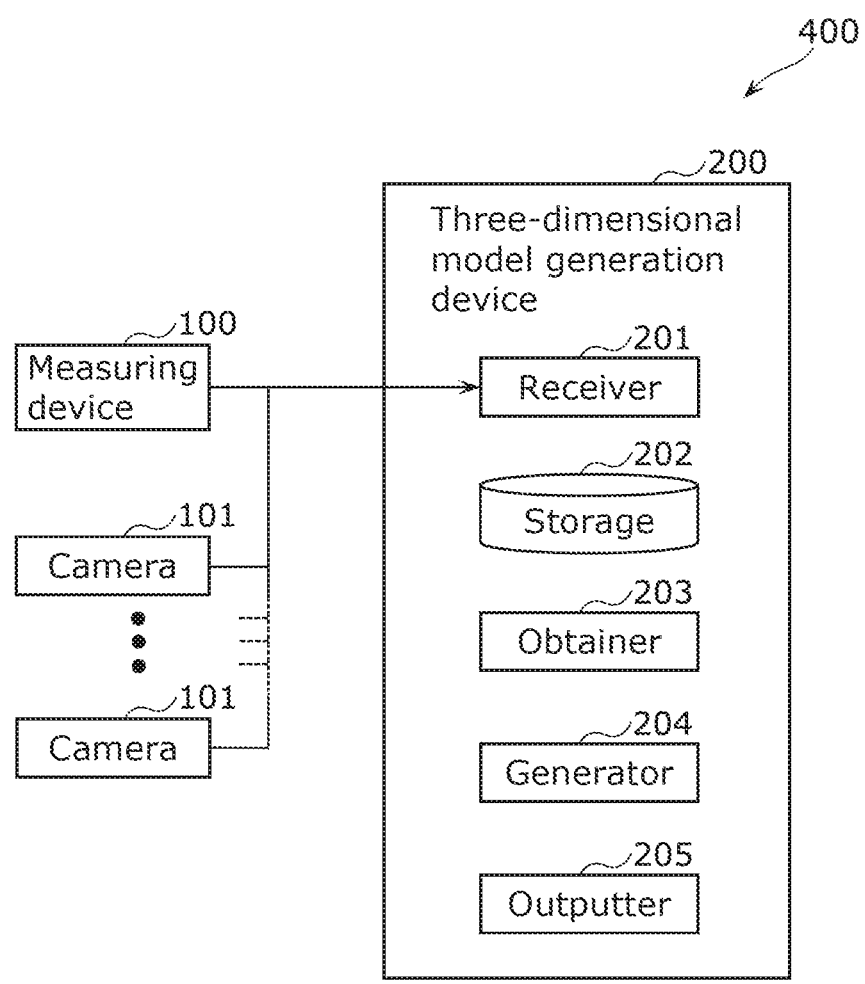
FIG. 2 is a block diagram illustrating a characteristic configuration of a three-dimensional model generation device according to an embodiment.
Figure 3:
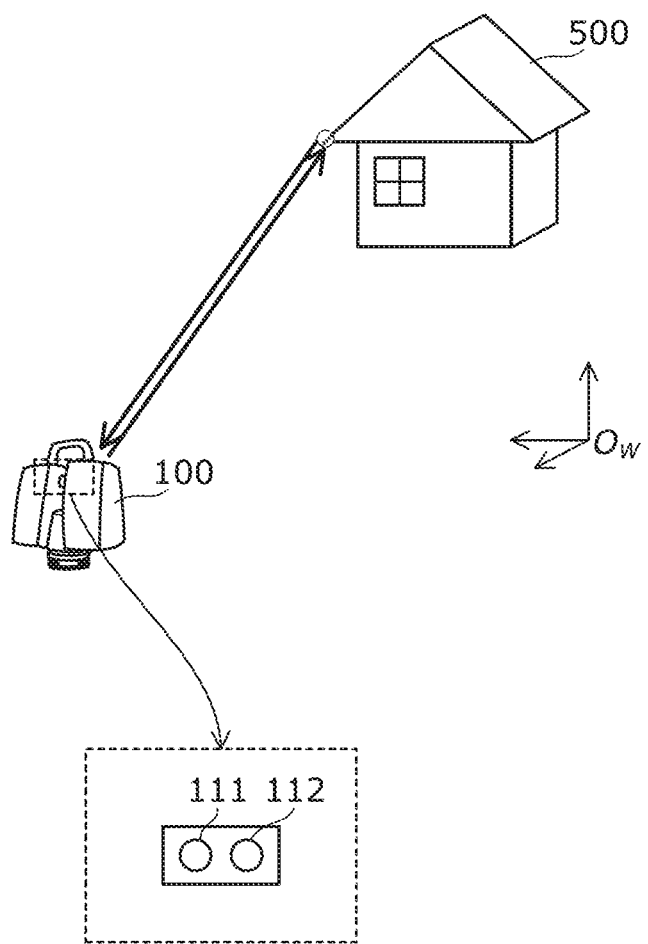
FIG. 3 is a diagram for describing a configuration of a measuring device.

FIG. 2 is a block diagram illustrating the characteristic configuration of a three-dimensional model generation device according to an embodiment. FIG. 3 is a diagram for describing the configuration of a measuring device.

As illustrated in FIG. 2, three-dimensional model generation system 400 includes measuring device 100, cameras 101, and three-dimensional model generation device 200.

(Measuring Device)

Measuring device 100 generates a first three-dimensional model by emitting electromagnetic waves, and obtaining reflected waves, which are electromagnetic waves emitted, and reflected by measurement target 500. Specifically, measuring device 100 measures the time taken until the emitted electromagnetic waves are reflected by measurement target 500 and return to measuring device 100 since the electromagnetic waves are emitted, and calculates the distance between measuring device 100 and a point on a surface of measurement target 500 by using the measured time and the wavelength of the electromagnetic waves. Measuring device 100 emits electromagnetic waves in a plurality of predetermined radial directions from a reference point of measuring device 100. For example, measuring device 100 emits electromagnetic waves at a first angular interval around a horizontal direction, and emits electromagnetic waves at a second angular interval around a vertical direction. Therefore, measuring device 100 can calculate the three-dimensional coordinates of a plurality of points on measurement target 500 by detecting the distance to measurement target 500 in each of the plurality of directions around measuring device 100. Thus, measuring device 100 can calculate first geometry information indicating a plurality of first three-dimensional positions on measurement target 500 around measuring device 100, and can generate a first three-dimensional model including the first geometry information. The first geometry information may be a first three-dimensional point cloud including a plurality of first three-dimensional points indicating a plurality of first three-dimensional positions.

In the present embodiment, as illustrated in FIG. 3, measuring devices 100 is a three-dimensional laser measuring device including laser emitter 111 that irradiates laser light as electromagnetic waves, and laser receiver 112 that receives reflected light, which is the irradiated laser light reflected by measurement target 500. Measuring device 100 scans measurement target 500 with laser light by rotating or oscillating a unit including laser emitter 111 and laser receiver 112 in two different axes, or by installing a movable mirror (Micro Electro Mechanical Systems (MEMS) mirror) oscillated in two axes on the pathway of irradiated or received laser. Accordingly, measuring device 100 can generate a highly accurate and high density first three-dimensional model of measurement target 500. Note that, here, the first three-dimensional model generated is, for example, a three-dimensional model in a world coordinate system.

Although the three-dimensional laser measuring device that measures the distance to measurement target 500 by irradiating laser light has been illustrated as measuring device 100, measuring device 100 is not limited to this, and may be a millimeter wave radar measuring device that measures the distance to measurement target 500 by emitting millimeter waves.

Additionally, measuring device 100 may generate a first three-dimensional model including first color information. The first color information is the color information generated by using an image shot by measuring device 100, and is the color information indicating the color of each of a plurality of first three-dimensional points included in a first three-dimensional point cloud.

Specifically, measuring device 100 may have a built-in camera for shooting measurement target 500 around measuring device 100. The camera built into measuring device 100 shoots an area including the irradiation range of the laser light irradiated by measuring device 100. Additionally, the shooting range shot by the camera is associated with the irradiation range in advance. Specifically, a plurality of directions in which the laser light is irradiated by measuring device 100 are associated with respective pixels in an image shot by the camera in advance, and as the first color information indicating the color of each of a plurality of first three-dimensional points included in a first three-dimensional point cloud, measuring device 100 sets a pixel value of an image associated with the direction of the first three-dimensional point.

In this manner, the first three-dimensional model of measurement target 500 generated by measuring device 100 is represented by, for example, a group of the first three-dimensional points indicating respective first three-dimensional positions of a plurality of measurement points on measurement target 500 (a surface of measurement target 500). A group of three-dimensional points is called a three-dimensional point cloud. The first three-dimensional position indicated by each three-dimensional point of a three-dimensional point cloud is represented by, for example, three dimensional coordinates of three-value information that includes an X component, a Y component, and an X component of a three-dimensional coordinate space including XYZ axes. Note that the first three-dimensional model may include not only three-dimensional coordinates, but also the first color information indicating the color of each point, or the shape information representing the surface shape of each point and its surrounding. The first color information may be represented by, for example, a color space of RGB, or may be represented by another color space, such as HSV, HLS, and YUV.

Measuring device 100 may be directly connected to three-dimensional model generation device 200 through wired communication or wireless communication, or may be indirectly connected to three-dimensional model generation device 200 via a hub not illustrated, such as communication equipment or a server, so as to be able to output the generated first three-dimensional model to three-dimensional model generation device 200.

Additionally, measuring device 100 may generate a first three-dimensional model of measurement target 500 around measuring device 100 in each of a plurality of measuring positions. In this case, measuring device 100 may output a plurality of generated first three-dimensional models to three-dimensional model generation device 200, or may generate one first three-dimensional model by integrating the plurality of first three-dimensional models in a world coordinate system, and output the integrated one first three-dimensional model to three-dimensional model generation device 200.

Additionally, although the position of measurement point 501 on measurement target 500 has been indicated by a three-dimensional point cloud in the first three-dimensional model, the first three-dimensional model is not limited to this, and may be indicated by a depth image having the distance information from measuring device 100 to measurement point 501 as a pixel value. The pixel value of each pixel of the depth image may include the color information indicating the color of measurement target 500, in addition to the distance information.

(Cameras)

Cameras 101 are imaging devices for shooting measurement target 500. Each of cameras 101 shoots measurement target 500, and outputs a plurality of shot frames to three-dimensional model generation device 200. Additionally, cameras 101 shoot the same measurement target 500 from mutually different viewpoints. A frame is, in other words, an image. An image shot by each camera 101 is an image having a higher resolution than an image shot by measuring device 100. Note that each camera 101 need not be a camera having a higher resolution than the camera built into measuring device 100, and may be a camera that can shoot with more pixels than the camera of measuring device 100 with respect to the size of measurement target 500. An image shot by each camera 101 has a larger number of pixels per unit area in a case where measurement target 500 is projected in two dimensions than an image shot by the camera of measuring device 100. Therefore, the accuracy of the color information in a specific point of measurement target 500 obtained from an image shot by each camera 101 is higher than the accuracy of the color information in a specific point of measurement target 500 obtained from an image shot by the camera of measuring device 100.

Note that, although three-dimensional model generation system 400 has been described to include a plurality of cameras 101, three-dimensional model generation system 400 is not limited to this, and may include one camera 101. For example, three-dimensional model generation system 400 may cause one camera 101 to shoot measurement target 500 that exists in a real space while moving one camera 101, so as to generate a multi-viewpoint image including a plurality of frames from mutually different viewpoints. The plurality of frames are frames shot (generated) by cameras 101 that differ from each other in at least one of the position or posture of camera 101, respectively.

Additionally, each camera 101 may be a camera that generates a two-dimensional image, or a camera that includes a three-dimensional measuring sensor for generating a three-dimensional model. In the present embodiment, cameras 101 are cameras each generating a two-dimensional image.

Cameras 101 may be directly connected to three-dimensional model generation device 200 through wired communication or wireless communication, or may be indirectly connected to three-dimensional model generation device 200 via a hub not illustrated, such as communication equipment or a server, so as to be able to output a frame that is shot by each camera to three-dimensional model generation device 200.

Note that frames that are shot by respective cameras 101 may be output to three-dimensional model generation device 200 in real time. Additionally, once a frame is recorded in external storage devices such as a memory or a cloud server, the frame may be output to three-dimensional model generation device 200 from these external storage devices.

Additionally, cameras 101 may be fixed cameras such as surveillance cameras, may be mobile cameras such as video cameras, smart phones, or wearable cameras, or may be moving cameras such as drones with a shooting function. Each of cameras 101 may be anything that does not include the configuration that performs measuring by emitting electromagnetic waves, and receiving reflected waves.

Additionally, each camera 101 may be a camera that shoots an image with a higher resolution than the camera built into measuring device 100. The number of pixels of an image shot by each camera 101 may be larger than the number of three-dimensional point clouds that can be measured by measuring device 100 at once.

(Three-Dimensional Model Generation Device)

Three-dimensional model generation device 200 obtains a first three-dimensional model from measuring device 100. Additionally, three-dimensional model generation device 200 obtains a multi-viewpoint image generated by shooting measurement target 500 from different viewpoints, by obtaining a plurality of frames from each of cameras 101. Then, three-dimensional model generation device 200 generates a second three-dimensional model by enhancing the definition of the first three-dimensional model by using the multi-viewpoint image. Note that each of the viewpoints may be the same as or different from any of the measuring positions of measuring device 100 (the positions of measuring device 100 at the time of measurement). In other words, the viewpoints at the time of the shooting by cameras 101 may be the same as or different from any of the viewpoints at the time of shooting by the built-In camera of measuring device 100.

Three-dimensional model generation device 200 at least includes a computer system including, for example, a control program, a processing circuit such as a processor or a logical circuit that executes the control program, and a recording device such as an internal memory that stores the control program, or an accessible external memory. Three-dimensional model generation device 200 is an information processing device. The function of each processing unit of three-dimensional model generation device 200 may be realized by software, or may be realized by hardware.

Additionally, three-dimensional model generation device 200 may store a camera parameter in advance. In addition, cameras 101 may be communicatively connected to three-dimensional model generation device 200 wirelessly or with wires.

Additionally, a plurality of frames shot by camera 101 may be directly output to three-dimensional model generation device 200. In this case, for example, camera 101 may be directly connected to three-dimensional model generation device 200 through wired communication or wireless communication, or may be indirectly connected to three-dimensional model generation device 200 via a hub not illustrated, such as communication equipment or a server.

Referring to FIG. 2, the details of the configuration of three-dimensional model generation device 200 will be described.

Three-dimensional model generation device 200 includes receiver 201, storage 202, obtainer 203, generator 204, and outputter 205.

Receiver 201 receives a first three-dimensional model from measuring device 100. Receiver 201 receives a plurality of frames (that is, a multi-viewpoint image) from a plurality of cameras 101. Receiver 201 outputs, to storage 202, the received first three-dimensional model and the frames. Receiver 201 may output, to storage 202, a three-dimensional model that is obtained by dividing the geometry information of the first three-dimensional model, or that is obtained by extracting and dividing a part of the geometry information, or that includes the geometry information of the extracted part, and may cause storage 202 to store the first three-dimensional model. Note that receiver 201 may receive the first three-dimensional model from measuring device 100 via other information processing device. Similarly, receiver 201 may receive frames from cameras 101 via other information processing device.

Receiver 201 is, for example, a communication interface for communicating with measuring device 100 and cameras 101. When three-dimensional model generation device 200 wirelessly communicates with measuring device 100 and cameras 101, receiver 201 includes, for example, an antenna and a wireless communication circuit. Alternatively, when three-dimensional model generation device 200 performs wired communication with measuring device 100 and cameras 101, receiver 201 includes, for example, a connector connected to a communication line, and a wired communication circuit. Receiver 201 is an example of a first obtainer and a second obtainer. In this manner, the first obtainer and the second obtainer may be realized by one processing unit, or may be realized by two processing units, each of which is independent of the other.

Storage 202 stores the first three-dimensional model and the frames received by receiver 201. Storage 202 may store a processing result of a processing unit included in three-dimensional model generation device 200. Storage 202 may store, for example, a control program executed by each processing unit included in three-dimensional model generation device 200. Storage 202 is realized by, for example, a hard disk drive (HDD), a flash memory, or the like.

Obtainer 203 obtains, from storage 202, the first three-dimensional model and the frames stored in storage 202, and outputs them to generator 204.

Note that three-dimensional model generation device 200 need not include storage 202 and obtainer 203. In this case, receiver 201 may output, to generator 204, the first three-dimensional model received from measuring device 100, and the frames received from cameras 101.

Generator 204 generates a second three-dimensional model with a higher accuracy and a higher density than the first three-dimensional model, by enhancing the definition of at least one of the geometry information or color information of the first three-dimensional model by using a multi-viewpoint image. Specific processing by generator 204 will be described later.

Outputter 205 transmits the second three-dimensional model generated by generator 204 to an external device. Outputter 205 includes, for example, a display device such as a display not illustrated, and an antenna, a communication circuit, a connector, and the like for wired or wireless communicative connection. Outputter 205 outputs an integrated three-dimensional model to the display device, thereby causing the display device to display the three-dimensional model.

[Operation of Three-Dimensional Model Generation Device]

Figure 4:
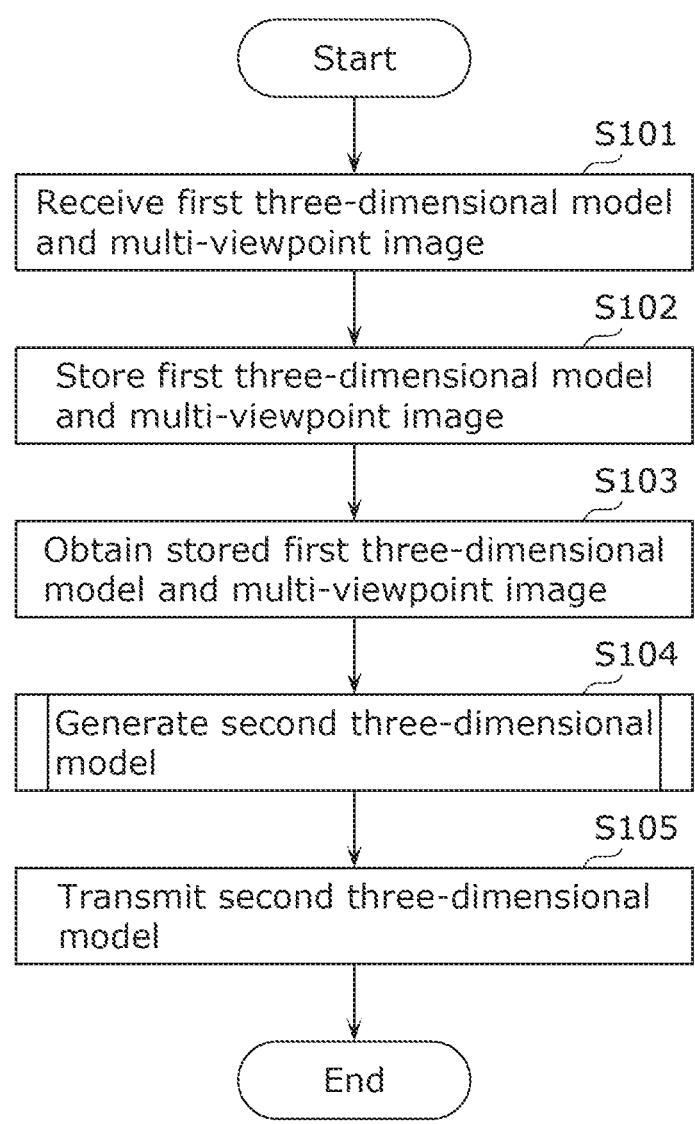
FIG. 4 is a flowchart illustrating an example of an operation of a three-dimensional model generation device.

Next, the operation of three-dimensional model generation device 200 will be described using FIG. 4. FIG. 4 is a flowchart illustrating an example of the operation of a three-dimensional model generation device.

First, in three-dimensional model generation device 200, receiver 201 receives a first three-dimensional model from measuring device 100, and receives a plurality of frames (that is, a multi-viewpoint image) from a plurality of cameras 101 (S101). Step S101 is an example of a first obtaining step and a second obtaining step. Note that receiver 201 need not receive the first three-dimensional model and the multi-viewpoint image in one timing, and may receive each of them in a different timing. That is, the first obtaining step and the second obtaining step may be performed in the same timing, or may be performed in different timings.

Next, storage 202 stores the first three-dimensional model and the multi-viewpoint image received by receiver 201 (S102).

Next, obtainer 203 obtains the first three-dimensional model and the multi-viewpoint image stored in storage 202, and outputs the obtained first three-dimensional model and multi-viewpoint image to generator 204 (S103).

Generator 204 generates a second three-dimensional model with a higher accuracy and a higher density than the first three-dimensional model, by enhancing the definition of at least one of the geometry information or color information of the first three-dimensional model by using the multi-viewpoint image obtained by obtainer 203 (S104). Step S104 is an example of a generation step.

Then, outputter 205 outputs the second three-dimensional model generated in generator 204 (S105).

Figure 5:
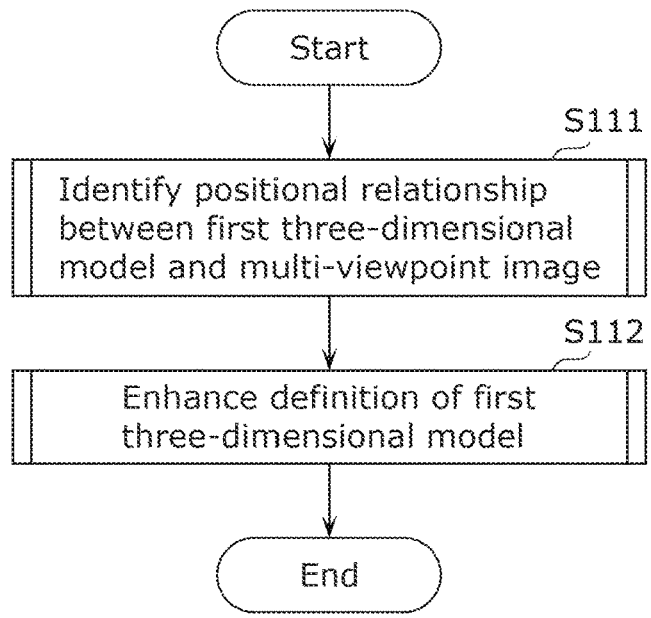
FIG. 5 is a flowchart illustrating an example of detailed processing in a generation step.

Next, the processing (S104) in generator 204 of three-dimensional model generation device 200 will be described using FIG. 5. FIG. 5 is a flowchart illustrating an example of the detailed processing in the generation step.

Generator 204 identifies a first positional relationship, which is the positional relationship between a first three-dimensional model and a multi-viewpoint image (S111). That is, generator 204 identifies, as the first positional relationship, the position and posture of camera 101 at the time when each image included in the multi-viewpoint image is shot in the three-dimensional coordinate axes of the first three-dimensional model. The position of camera 101 at the time of shooting is the viewpoint in a shot imaged, and the posture of camera 101 at the time of shooting is the direction of the optical axis of camera 101, i.e., the shooting direction. The position and posture of camera 101 are external parameters of camera 101. The details of axial alignment processing will be described later.

Next, generator 204 enhance the definition of at least one of the first geometry information or first color information of the first three-dimensional model by using the identified first positional relationship and the multi-viewpoint image (S112). Specifically, generator 204 may increase the accuracy of the color information of the first three-dimensional model, by changing the first color information of the first three-dimensional model into second color information having a higher accuracy than the first color information. Additionally, generator 204 may interpolate a second three-dimensional position on measurement target 500 between two positions included in a plurality of first three-dimensional positions of the first three-dimensional model. Of course, generator 204 may interpolate the second three-dimensional position on measurement target 500 between three or more positions. Additionally, generator 204 may detect a defective part of the first geometry information, and may interpolate a third three-dimensional position on measurement target 500 in the detected defective part.

Figure 6:
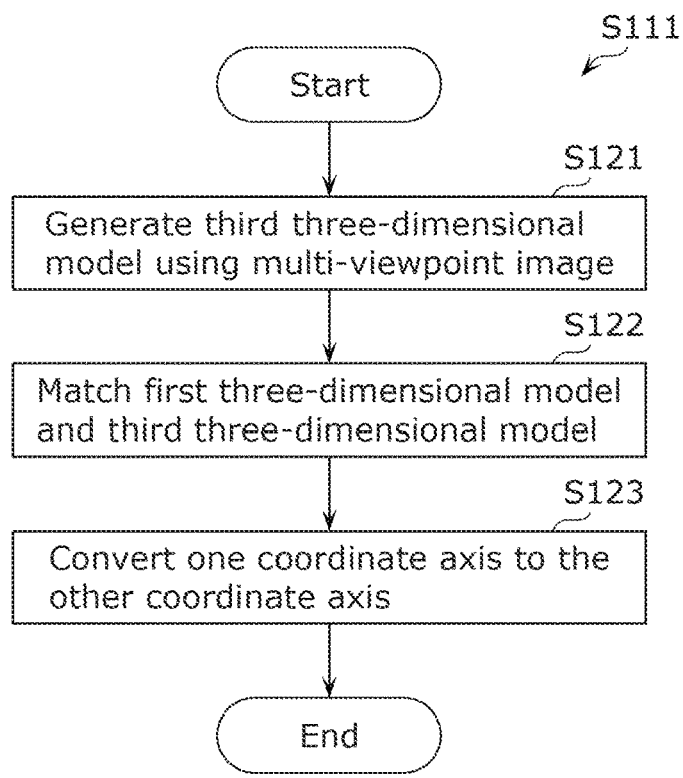
FIG. 6 is a flowchart illustrating an example of detailed processing of an axial alignment processing.

Next, the axial alignment processing (S111) by generator 204 will be described using FIG. 6. FIG. 6 is a flowchart illustrating an example of the detailed processing of the axial alignment processing.

Generator 204 generates a third three-dimensional model by using a multi-viewpoint image (S121). In the present disclosure, a three-dimensional model generated by using a multi-viewpoint image is called a third three-dimensional model. Note that, in the generation of a third three-dimensional model, generator 204 may generate a three-dimensional model including a three-dimensional point cloud of only the contour part of measurement target 500 as the third three-dimensional model, or may generate a three-dimensional model including a three-dimensional point cloud of the contour part of measurement target 500 and an object around measurement target 500 as the third three-dimensional model.

Here, the generation (that is, the three-dimensional reconstruction) of a third three-dimensional model using a multi-viewpoint image obtained by camera 101 in the present disclosure will be defined. An image of measurement target 500 that exists in a real space shot by one or more cameras from different viewpoints is called a multi-viewpoint image. A multi-viewpoint image may be an image group including a plurality of frames obtained by shooting a video while moving one or more cameras, may be an image group including a plurality of still images obtained by shooting from a plurality of positions with one or more cameras, or may be an image group including a plurality of still images obtained by shooting with a plurality of fixed cameras installed at a plurality of positions. Additionally, it may be an image group in which two or more image groups of these image groups are combined. That is, a multi-viewpoint image includes a plurality of two-dimensional images of the same measurement target 500 shot from different viewpoints. It is called three-dimensional reconstruction to reconstruct measurement target 500 in a three-dimensional space by using this multi-viewpoint image. Alternatively, it is called three-dimensional model generation to generate measurement target 500 in a three-dimensional space by using the multi-viewpoint image.

Figure 7:
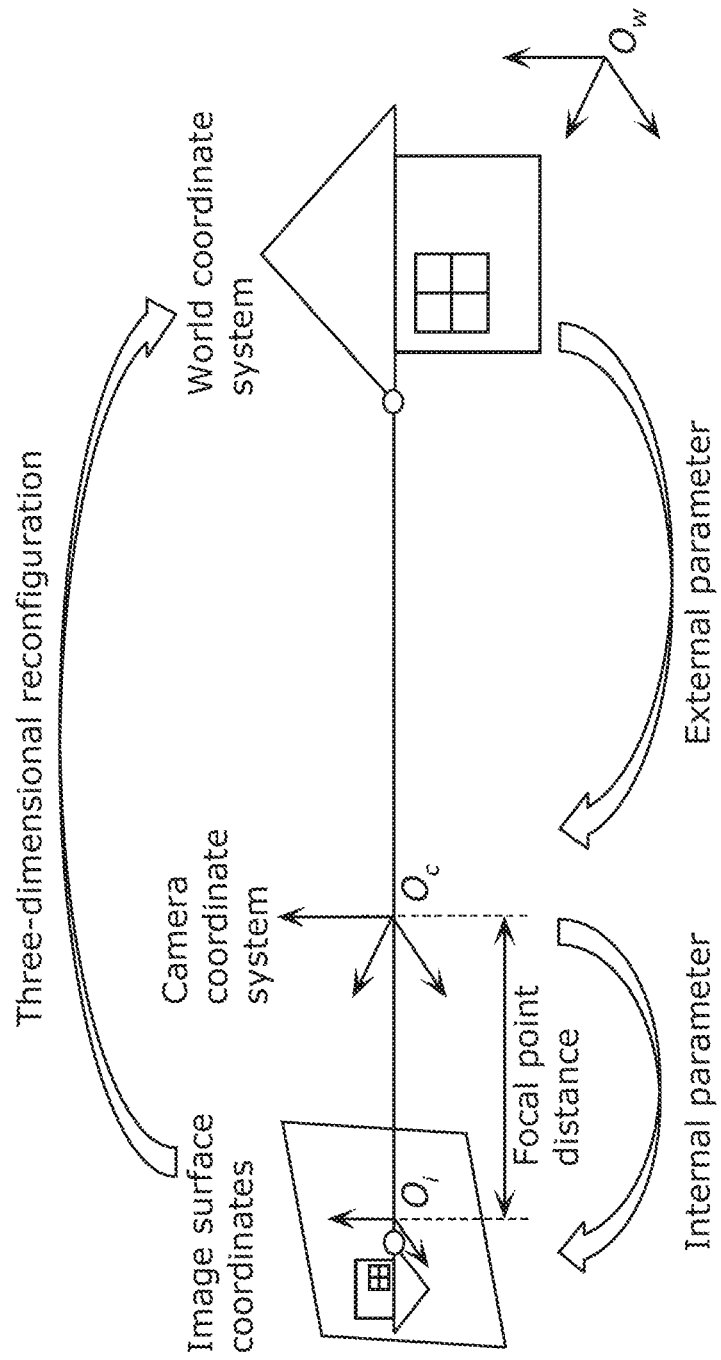
FIG. 7 is a diagram illustrating the mechanism of three-dimensional reconstruction.

FIG. 7 is a diagram illustrating the mechanism of three-dimensional reconstruction.

Generator 204 reconstructs a point on an image surface in a world coordinate system by using a camera parameter. Measurement target 500 reconstructed in the three-dimensional space is called a three-dimensional model. The three-dimensional model of measurement target 500 is represented by, for example, a group of third three-dimensional points that indicate the third three-dimensional positions of a plurality of respective measurement points on measurement target 500 (a surface of measurement target 500) reflected in a multi-viewpoint image. A group of three-dimensional points is called a three-dimensional point cloud. The three-dimensional position indicated by each three-dimensional point of a three-dimensional point cloud is represented by, for example, three dimensional coordinates of three-value information that includes an X component, Y component, and an X component of a three-dimensional-coordinate space including XYZ axes. Note that a three-dimensional model may include not only three-dimensional coordinates, but also information representing the color of each point, or the surface shapes of each point and its surrounding.

At this time, generator 204 may obtain the camera parameters of each camera in advance, or may estimate the camera parameters at the same time with creation of a three-dimensional model. The camera parameters include internal parameters including a focal point distance, an image center, and the like of a camera, and external parameters indicating the three-dimensional position and orientation of the camera.

FIG. 7 illustrates an example of a typical pinhole camera model. The lens distortion of a camera is not taken into consideration in this model. When the lens distortion is taken into consideration, generator 204 uses a corrected position obtained by normalizing the position of a point in image surface coordinates with a distortion model.

Figure 8:
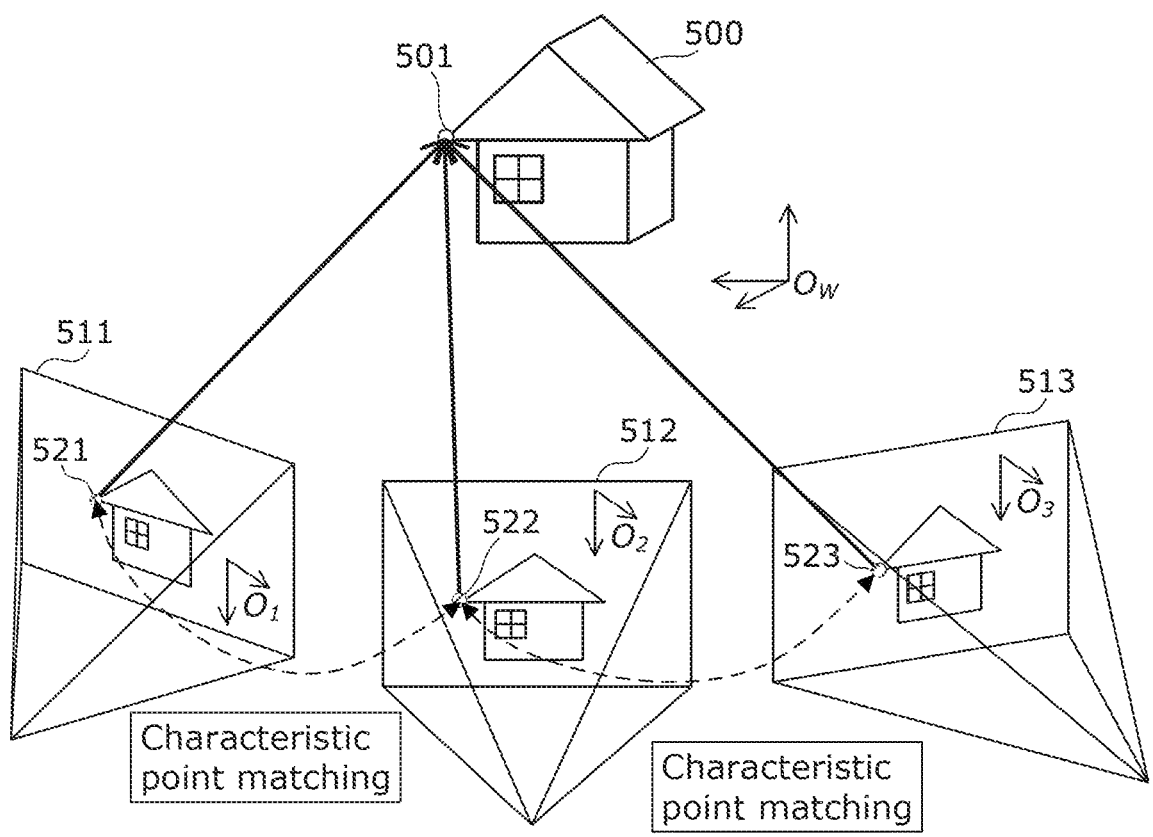
FIG. 8 is a diagram for describing a method of calculating a three-dimensional position by using a multi-viewpoint image.

Generator 204 uses two or more images with identified camera parameters and different viewpoints among multi-viewpoint images, in order to actually calculate a three-dimensional position. A calculating method of a three-dimensional position will be described using FIG. 8. FIG. 8 is a diagram for describing a method of calculating a three-dimensional position by using a multi-viewpoint image.

Generator 204 sets one of multi-viewpoint images as base image 512, and sets the other images as reference images 511 and 513. Generator 204 calculates the three-dimensional point corresponding to each pixel of base image 512 by using the multi-viewpoint images. Specifically, generator 204 identifies the correspondence of each pixel between multi-viewpoint images, and calculates the distance from each viewpoint to measurement target 500 by performing triangulation using a pixel having the identified correspondence and camera parameters. When performing processing on each pixel of base image 512, generator 204 searches for pixels corresponding to pixel 522, which is a processing target, from reference images 511 and 513. When generator 204 obtains pixels 521 and 523 corresponding to pixel 522 from reference images 511 and 513, generator 204 can calculate the three-dimensional position of measurement point 501 by triangulation based on the positions and orientations (postures) of cameras that have shot the respective images of the multi-viewpoint images. Note that the positions and orientations (postures) of the cameras that have shot the respective images of the multi-viewpoint images are indicated by the external parameters of the camera parameters.

As the number of reference images increases, the number of times of triangulation for 1 pixel of base image 512 increases, thus the accuracy of the three-dimensional position of measurement point 501 is improved. For example, even for the three-dimensional position of the same measurement point 501, the three-dimensional point using base image 512 and reference image 511 in FIG. 8 has a slightly different position from the three-dimensional point using base image 512 and reference image 513. Therefore, the accuracy is improved in a case where the three-dimensional position of one measurement point 501 is calculated by using two or more three-dimensional points than in a case where the three-dimensional position of one measurement point 501 is calculated by employing either one of the three-dimensional points. For example, generator 204 eventually calculates a highly accurate three-dimensional point of measurement point 501 with a method of calculating a plurality of candidates for the three-dimensional point of measurement point 501, and performing estimation from their average points and variations.

Figure 9:
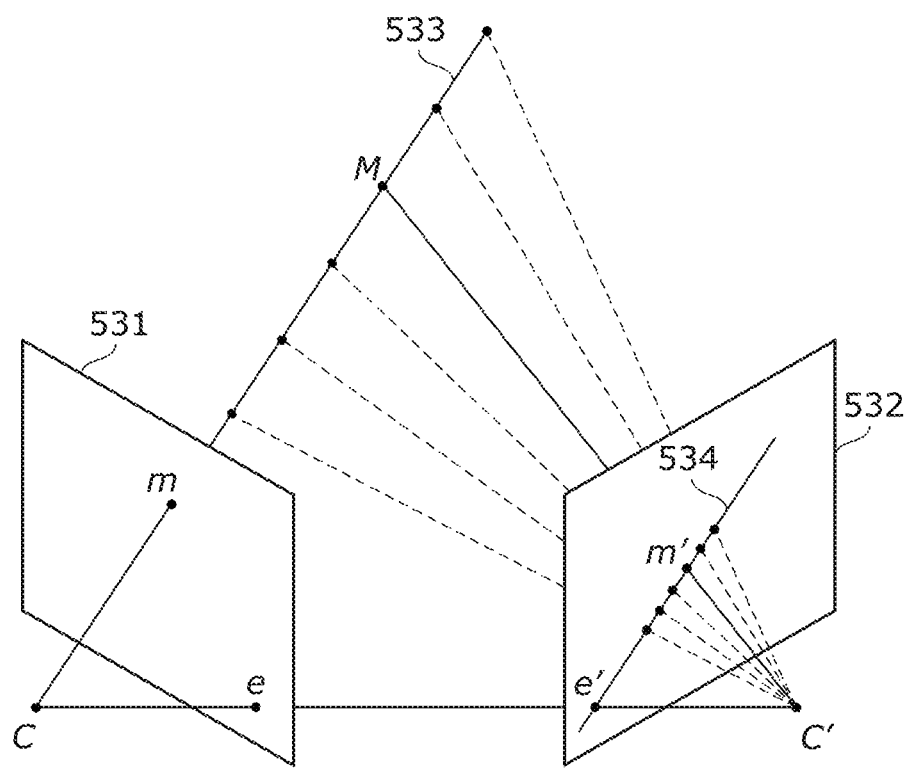
FIG. 9 is a diagram illustrating an epipolar constraint of a pair of characteristic points between two images.

FIG. 9 is a diagram illustrating the epipolar constraint of a pair of characteristic points between two images.

A description will be given of an example where, when a two-dimensional point m in image 531 obtained by shooting a three-dimensional point M in a three-dimensional space is used as a characteristic point, a characteristic point corresponding to the two-dimensional point m is found from image 532 by using the epipolar constraint. First, the optical center C of a camera with which image 531 has been shot, and the optical center C' of a camera with which image 532 has been shot are found by using the external parameters of the respective cameras. Then, straight line 533 in the three-dimensional space passing through the optical center C and the two-dimensional point m is calculated by using the optical center C of the camera, and the coordinates of the two-dimensional point m in image 531. Next, epipolar line 534, which is a line corresponding to straight line 533 in image 532, is calculated by using straight line 533, and the external parameters of the camera with which image 532 has been shot. Then, three-dimensional-point candidates can be obtained by performing triangulation of characteristic points on epipolar line 534 in image 532. That is, all the characteristic points on epipolar line 534 can be considered as the candidate points for identifying a two-dimensional point m' corresponding to the two-dimensional point m on straight line 533.

Figure 10:
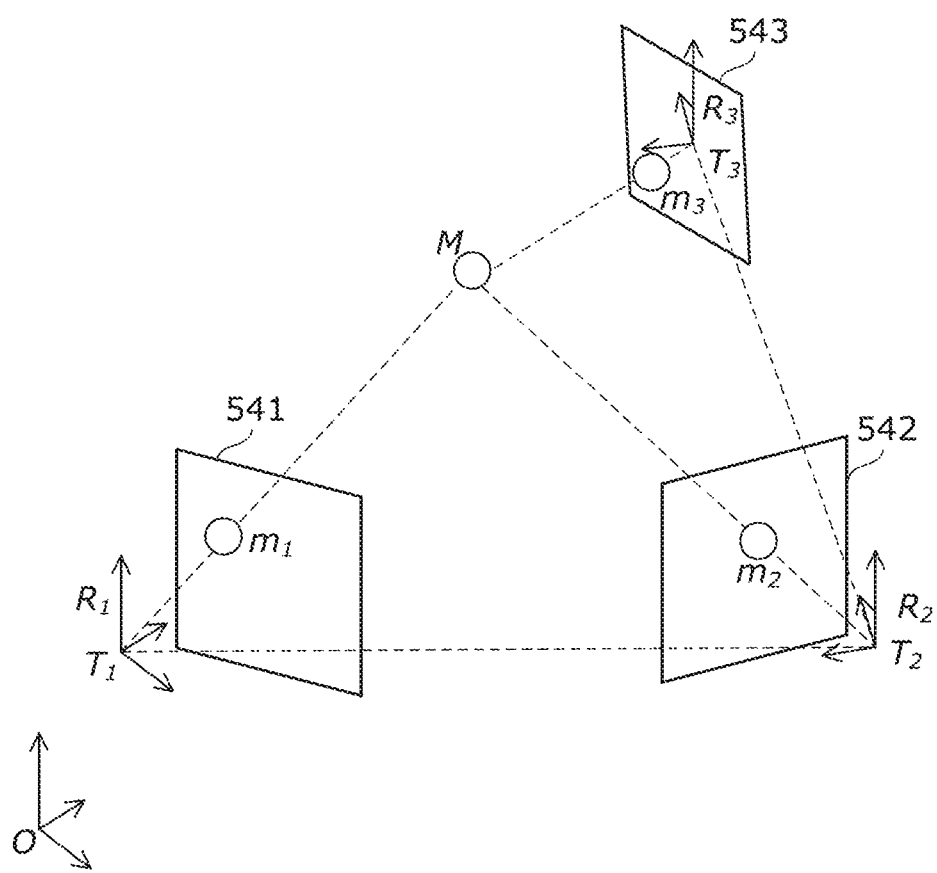
FIG. 10 is a diagram for describing an estimation method of camera parameters, and a generation method of a third three-dimensional model.

FIG. 10 is a diagram for describing an estimation method of camera parameters, and a generation method of a third three-dimensional model.

In the estimation method of camera parameters, and the generation method of a third three-dimensional model, the coordinates and posture of a camera in the world coordinate system $O_w$ are calculated by using the epipolar constraint described using FIG. 9, and further, the three-dimensional position of a point on an image shot by the camera in the world coordinate system $O_w$ is calculated. A description will be given of an example in which the internal parameters of the camera are known, the external parameters of the camera are estimated by using three frames (image 541, image 542, and image 543), and a third three-dimensional model of measurement target 500 is generated.

In order to obtain the camera parameters of each camera, it is necessary to calculate rotation matrices $R_1$, $R_2$, and $R_3$ and translation vectors $T_1$, $T_2$, and $T_3$ of the cameras in the world coordinate system with origin at 0. First, a description will be given of a method of calculating the rotation matrices and translation vectors of the cameras with which image 541 and image 542 have been shot. When a point $m_1=(u_1, v_1, 1)$ on image 541 corresponds to a point $m_2$ on image 542, the epipolar equation satisfying (Equation 1) is established for both.

[Math. 1]

$$m_1^T F m_2 = 0 \qquad \text{(Equation 1)}$$

Here, F is called a Fundamental matrix (F matrix). Generator 204 can obtain each point as point $m_1=(x_1, y_1, z_1)$ and $m_2=(x_2, y_2, z_2)$ in each camera coordinate system with a transformation equation indicated in (Equation 2) by using an internal parameter K of each camera. The epipolar equation can be rewritten as (Equation 3).

[Math. 2]

$$\tilde{m} = Km \qquad \text{(Equation 2)}$$

[Math. 3]

$$\tilde{m}_1^T E \tilde{m}_2 = 0 \qquad \text{(Equation 3)}$$

Here, E is called an Essential matrix (E matrix). Generator 204 can calculate each element of the E matrix by using a plurality of corresponding points. Additionally, generator 204 may obtain the E matrix with a transformation equation of (Equation 4), after calculating each element of the F matrix by using a plurality of corresponding points, such as the points $m_1$ and $m_2$, between images.

$$E = K^{-1} F K \quad \text{(Equation 4)}$$

Generator 204 can obtain the rotation matrix and translation vector from image 541 to image 542 in the world coordinate system by decomposing this E matrix. When the position of a first camera in the world coordinate system, and the inclination of the first camera with respect to each axis of the world coordinate system are known, generator 204 can obtain the positions and postures of the first camera and a second camera in the world coordinate system, by using the relative relationship between the first camera and the second camera. Generator 204 may calculate the position and posture of the first camera in the world coordinate system by using information on the camera other than a video (for example, information obtained by a sensor, such as a gyro sensor or an acceleration sensor, included in the camera), or may measure them in advance. Additionally, the positions and postures of the other cameras may be calculated by using the camera coordinate system of the first camera as the world coordinate system.

Note that, when the lens distortion of a camera is taken into consideration, generator 204 corrects the position of a point on an image by using a distortion model, and obtains the F matrix or the E matrix by using the corrected position. Generator 204 uses, as an example, a distortion model in the radial direction of a lens indicated in (Equation 5).

$$u_{undistorted} = u(1 + k_1 r^2 + k_2 r^4 + k_3 r^6)$$

$$v_{undistorted} = v(1 + k_1 r^2 + k_2 r^4 + k_3 r^6)$$

$$r^2 = u^2 + v^2 \quad \text{(Equation 5)}$$

Additionally, generator 204 can obtain the coordinates of the three-dimensional point M, which is the corresponding point in the world coordinate system of a corresponding point, with a triangle formed by using the rotation matrices and translation vectors of image 541 and image 542.

Additionally, the above geometrical relationship can be extended to three viewpoints. When adding image 543 to image 541 and image 542, generator 204 calculates the E matrices for image 542 and image 543, and for image 541 and image 543, respectively, and obtains a relative rotation matrix and translation vector between each camera. By integrating these, generator 204 can calculate the rotation matrix and translation vector in the world coordinate system of the camera of image 543.

Additionally, the rotation matrix and translation vector of image 543 may be calculated from corresponding points in image 543 and image 541, and in image 543 and image 542, respectively. In detail, the corresponding points are found in image 541 and image 543, and in image 542 and image 543. Here, suppose that a point $m_3$ on image 543 corresponding to the point $m_1$ on image 541 and the point $m_2$ on image 542 is obtained, since the coordinates of the three-dimensional point M of this corresponding point has been obtained, the correspondence between a point on image 543 and the coordinates in the three-dimensional space can be obtained. At this time, (Equation 6) is established.

[Math. 4]

$$\tilde{m} = Pm \quad \text{(Equation 6)}$$

Here, P is called a Perspective matrix (P matrix). Since the relationship of (Equation 7) is established among the P matrix, the E matrix, and an internal matrix, generator 204 can obtain the E matrix of image 543, and accordingly, can find the rotation matrix and translation vector.

$$P = KE \quad \text{(Equation 7)}$$

Note that, even when the internal parameter is unknown, after calculating the F matrix or the P matrix, generator 204 can find the internal matrix and the E matrix by dividing the F matrix and the P matrix under restrictions that the internal matrix is an upper triangular matrix, and the E matrix is a positive definite symmetric matrix.

Let us return to the description of FIG. 6. After step S121, generator 204 performs matching between the first three-dimensional model and the third three-dimensional model, and calculates coordinate axis difference information that indicates the differences in the scale, orientation, and position between each coordinate axis (S122). Specifically, generator 204 uses first geometry information included in the first three-dimensional model, and third geometry information included in the third three-dimensional model to perform matching that identifies a plurality of first three-dimensional positions of the first geometry information, and a plurality of third three-dimensional positions of the third geometry information, which are in correspondence with each other. Then, generator 204 calculates the coordinate axis difference information between the first geometry information and the third geometry information by using the matching result. The difference in the scale in a coordinate axis is, for example, the size ratio between the first three-dimensional model and the third three-dimensional model. The difference in the position is, for example, the difference in the distance between the point on the first three-dimensional model and the point on the third three-dimensional model, the points corresponding to a specific point of measurement target 500. The difference in the orientation is, for example, the difference between the specific orientation of the first three-dimensional model and the specific orientation of the third three-dimensional model, the specific orientations corresponding to a specific direction of the measurement target.

In the matching processing that matches the first three-dimensional model with the third three-dimensional model, generator 204 performs the matching processing by using either one of two methods. As a first method, in order to minimize the error between a part of the first geometry information of the first three-dimensional model and a part of the third geometry information of the third three-dimensional model, generator 204 performs the matching processing that matches one of the part of the first geometry information and the part of the third geometry information with the other of these. Additionally, as a second method, in order to minimize the error between the entire first geometry information of the first three-dimensional model and the entire third geometry information of the third three-dimensional model, generator 204 performs the matching processing that matches one of a part of the first geometry information and a part of the third geometry information with the other of these. For example, when the reliability of the third three-dimensional model exhibits higher reliability than predetermined reliability, generator 204 may perform the matching processing with the first method, and when the reliability of the third three-dimensional model exhibits lower reliability than the predetermined reliability, generator 204 may perform the matching processing with the second method.

The following index may be used as the reliability of the third three-dimensional model. In index calculation, generator 204 reprojects each of a plurality of third three-dimensional positions indicated by the third geometry information onto each image of multi-viewpoint images, by using the camera parameters of a camera with which the multi-viewpoint images used as the basis for the generation of the third three-dimensional model have been shot. Then, generator 204 calculates the reliability indicated by the error between the position of a pixel on each image used as the basis for the calculation of each third three-dimensional position, and the position of a reprojected pixel. The smaller the value of the calculated reliability, the more reliable it is.

Figure 11:
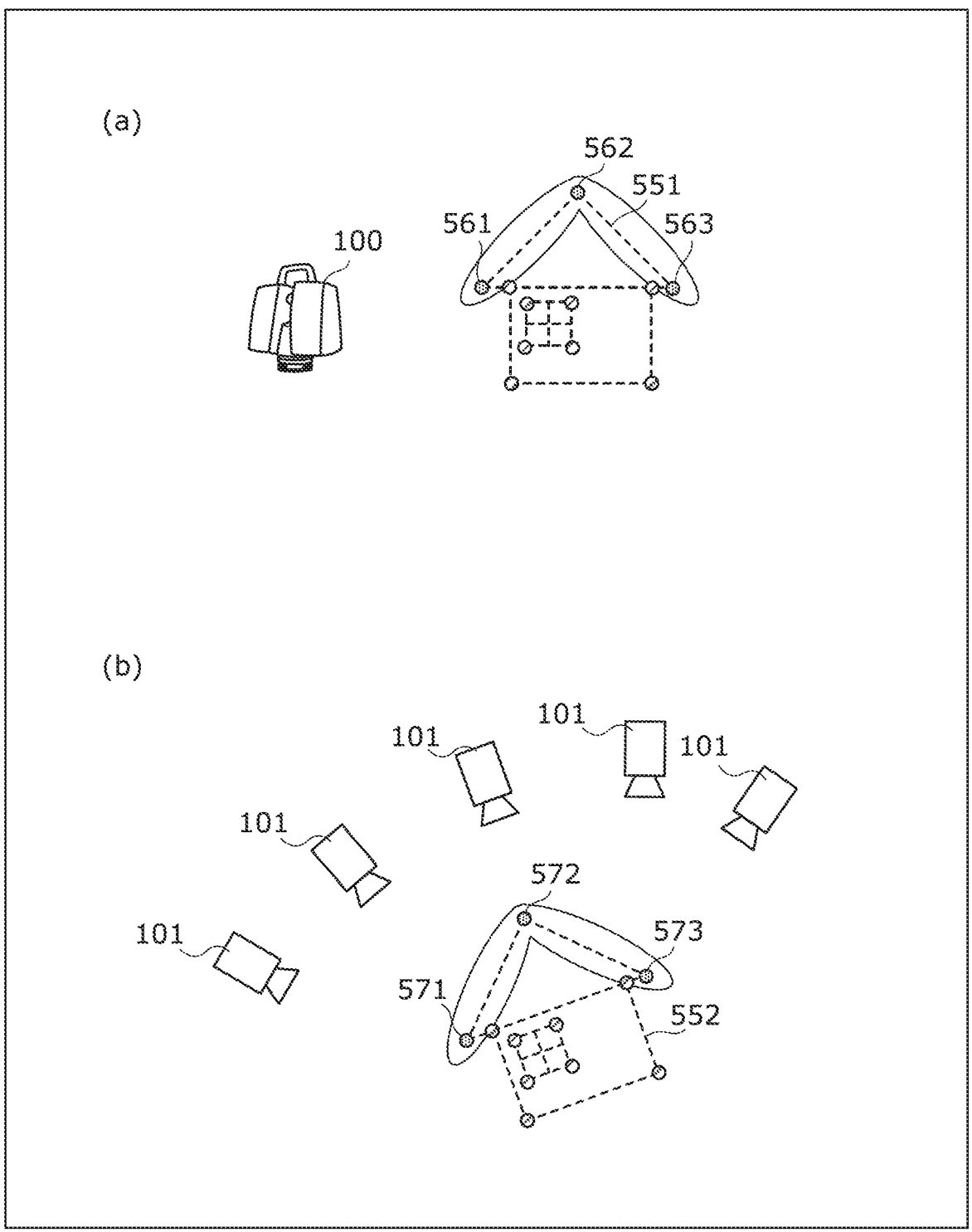
FIG. 11 is a diagram for describing a first method of the matching processing.

FIG. 11 is a diagram for describing the first method of the matching processing. In FIG. 11, (a) illustrates first three-dimensional model 551 generated by measuring device 100, and (b) illustrates third three-dimensional model 552 generated by using a multi-viewpoint image shot by the plurality of cameras 101. In the first method, manual selection is received between at least three three-dimensional points included in first three-dimensional model 551, and at least three three-dimensional points included in third three-dimensional model 552, which are in correspondence with each other. Specifically, three-dimensional model generation device 200 receives, from a user via an input IF not illustrated such as a touch panel, a keyboard, and a mouse, inputs indicating that three-dimensional point 561 and three-dimensional point 571 are in correspondence, three-dimensional point 562 and three-dimensional point 572 are in correspondence, and three-dimensional point 563 and three-dimensional point 573 are in correspondence. Accordingly, since generator 204 can identify that three-dimensional points 561 to 563 of first three-dimensional model 551 and three-dimensional points 571 to 573 of third three-dimensional model 552 are in correspondence, respectively, according to the received inputs, generator 204 can calculate the coordinate axis difference information.

Figure 12:
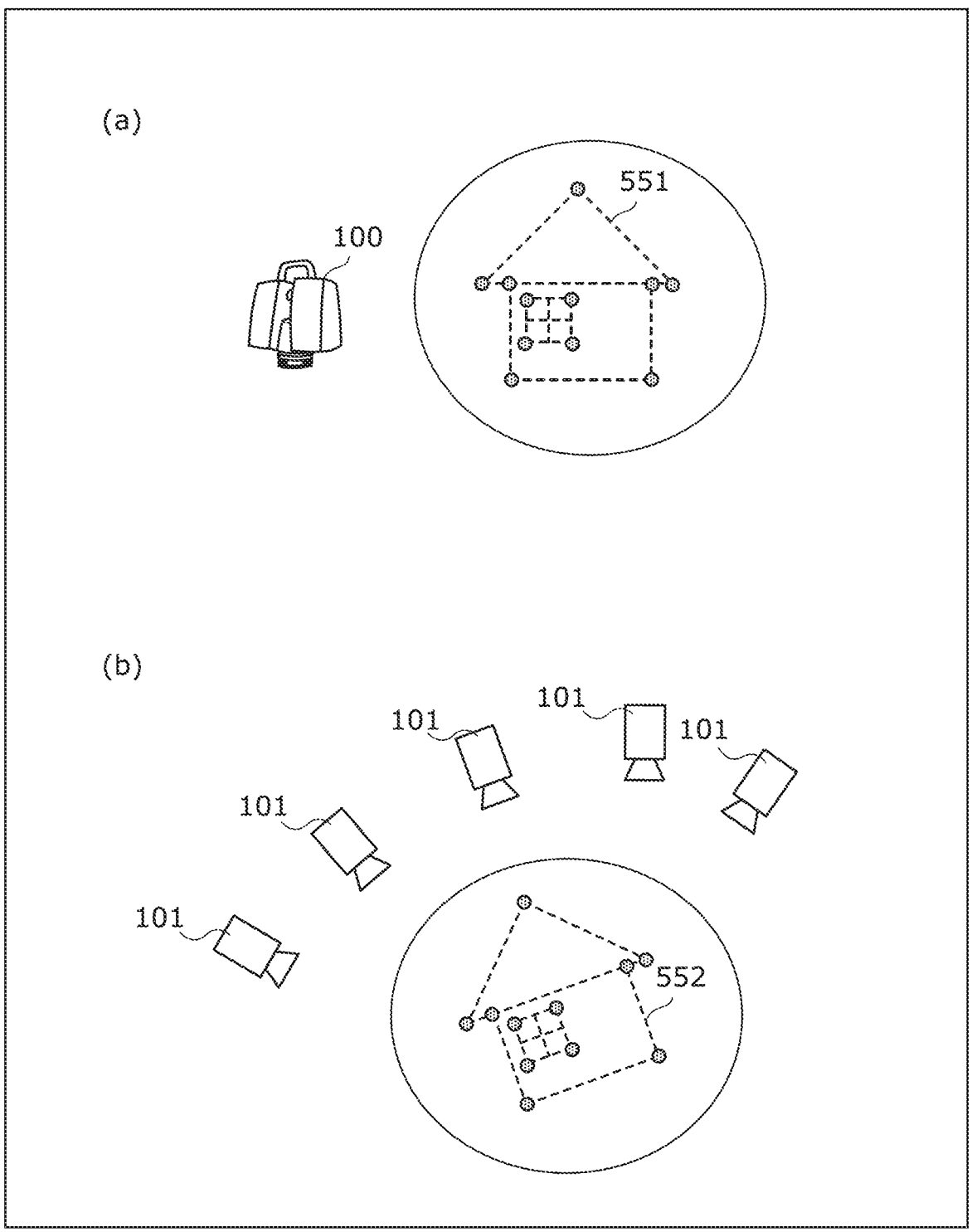
FIG. 12 is a diagram for describing a second method of the matching processing.

FIG. 12 is a diagram for describing the second method of the matching processing. In FIG. 12, (a) illustrates first three-dimensional model 551 generated by measuring device 100, and (b) illustrates third three-dimensional model 552 generated by using a multi-viewpoint image shot with the plurality of cameras 101. In the second method, in order to minimize the errors between all three-dimensional points included in first three-dimensional model 551 and all three-dimensional points included in third three-dimensional model 552, generator 204 uses, for example, the calculation formula (Equation 8) of iterative Closest Point (ICP) illustrated below to match the scale, position, and orientation of one of the coordinate axes with the other, thereby calculating the coordinate axis difference information between the first geometry information and the third geometry information. Note that, in the second method, the three-dimensional coordinate axes of first three-dimensional model 551 may be matched with the three-dimensional coordinate axes of third three-dimensional model 552, without calculating the coordinate axis difference information.

[Math. 5]

$$err = \sum_{k=n}^{N} \|P_{Rn} - sRP_{Tn} - T\|^2 \quad \text{(Equation 8)}$$

Note that, although generator 204 has been described to use all three-dimensional points included in first three-dimensional model 551 and all three-dimensional points included in third three-dimensional model 552, generator 204 need not use all of the three-dimensional points, and may perform the matching processing with the ICP between parts of the three-dimensional points, the number of a part of the three-dimensional points being a predetermined percentage of the total three-dimensional points. Note that the matching processing with the ICP may be performed by extracting a point where the reliability based on reprojection error exhibits higher reliability than predetermined reliability, and using the extracted three-dimensional point.

Note that when generator 204 uses an image shot by the built-in camera of measuring device 100 or an image shot at the same position as the camera for the generation of a third three-dimensional model, the image shot by the built-in camera of measuring device 100 is common to the first three-dimensional model and the third three-dimensional model. That is, since the correspondence between the first three-dimensional model and the third three-dimensional model can be identified even when the matching processing in step S122 is not performed, the matching processing in step S122 need not be performed.

That is, in this case, receiver 201 obtains second positional relationship, which is the positional relationship between an image shot by the built-in camera of measuring device 100, or an image shot at the same position as the camera, and the first three-dimensional model and the image. The image shot by the built-in camera of measuring device 100 is an example of an identified image for which the second positional relationship, which is the positional relationship with the first three-dimensional models, has been identified. The identified image may be an image shot at the same position as the built-in camera of measuring device 100, in addition to an image shot by the built-in camera of measuring device 100, or may be an image shot from a position whose positional relationship with measuring devices 100 has been identified. Generator 204 generates a third three-dimensional model by using a multi-viewpoint image and an identified image. Generator 204 identifies first relationship, which is the positional relationship between the first three-dimensional model and the multi-viewpoint image, by using the third three-dimensional model and the second positional relationship.

According to this, by generating the third three-dimensional model by using the identified image whose second positional relationship with the measuring device has been already identified as well as the multi-viewpoint image, the first positional relationship between the first three-dimensional model and the multi-viewpoint image can be easily identified.

Let us return to the description of FIG. 6. After step S122, generator 204 converts the coordinate axes of the first three-dimensional model into the coordinate axes of the third three-dimensional model, by using the calculated coordinate axis difference information (S123). Accordingly, generator 204 combines the three-dimensional coordinate axes of the first three-dimensional model with the three-dimensional coordinate axes of the third three-dimensional model. Thus, generator 204 can identify the first positional relationship between the first three-dimensional model and the multi-viewpoint image. Note that generator 204 may convert the coordinate axes of the third three-dimensional model into the coordinate axes of the first three-dimensional model.

The details of definition enhancing processing (S112) by generator 204 will be described. The definition enhancing processing is performed with the following three methods. In the definition enhancing processing, any one of the three methods may be used, or a combination of two or more of the three methods may be used.

Figure 13:
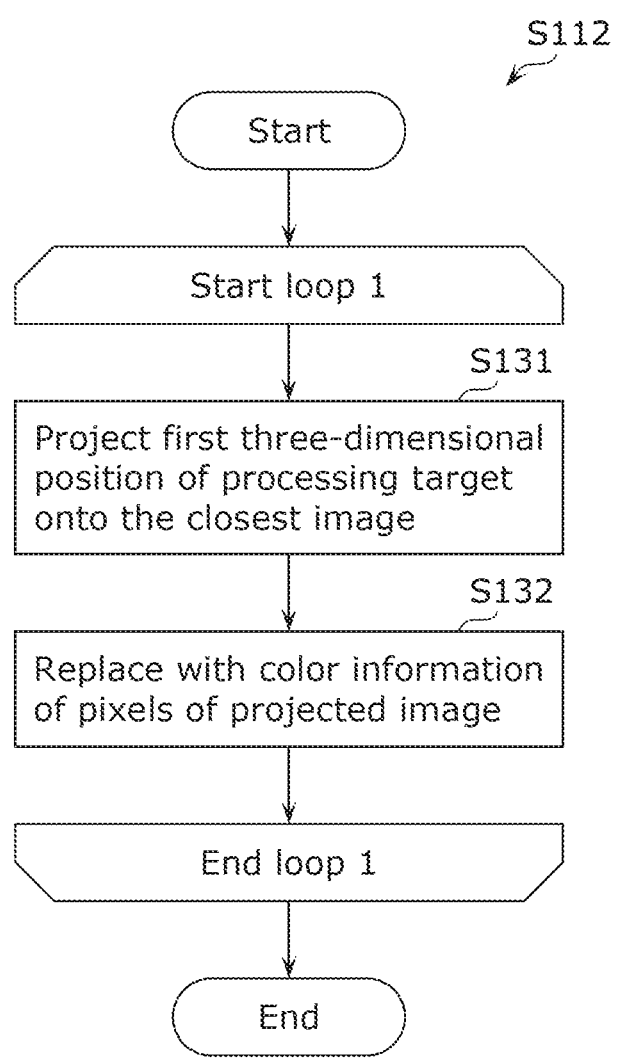
FIG. 13 is a flowchart illustrating a first method of definition enhancing processing.
Figure 14:
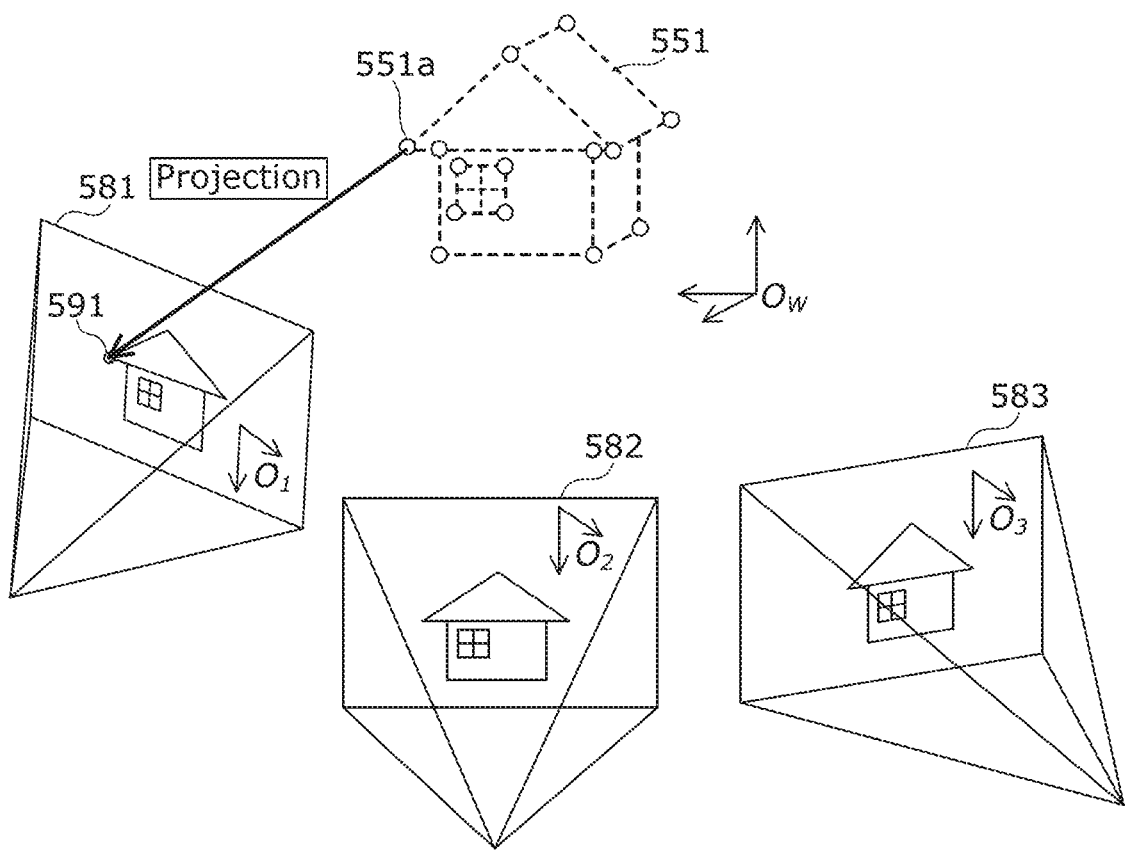
FIG. 14 is a diagram for describing the first method of the definition enhancing processing.

A first method of the definition enhancing processing (S112) by generator 204 will be described by using FIG. 13 and FIG. 14. FIG. 13 is a flowchart illustrating the first method of the definition enhancing processing. FIG. 14 is a diagram for describing the first method of the definition enhancing processing.

In the first method, for each of a plurality of first three-dimensional positions included in the first three-dimensional model, generator 204 changes first color information corresponding to the first three-dimensional position into second color information based on the pixel of the multi-viewpoint image corresponding to the first three-dimensional position, by using the first positional relationship and the multi-viewpoint image. Accordingly, generator 204 generates the second three-dimensional model in which the accuracy of the color information of the first three-dimensional model is improved.

Specifically, generator 204 performs loop 1 including the following step S131 and step S132 for each of a plurality of three-dimensional points 551a that indicate a plurality of first three-dimensional positions included in first three-dimensional model 551.

Generator 204 projects three-dimensional point 551a at a first three-dimensional position of a processing target onto image 581 shot at a position (viewpoint) closest to the first three-dimensional position among a plurality of images 581 to 583 of a multi-viewpoint image (S131). Accordingly, generator 204 identifies pixel 591 that is in image 581 shot at the position closest to the first three-dimensional position of the processing target of the multi-viewpoint image, and that is obtained by shooting three-dimensional point 551a.

Note that, although generator 204 has been described to select the image shot at the position closest to the first three-dimensional position of the multi-viewpoint image as the image onto which the first three-dimensional position of the processing target is to be projected, it is not limited to this. Generator 204 may calculate a normal vector in the first three-dimensional model of the first three-dimensional position of the processing target, and may select, from the multi-viewpoint image, an image that has been shot in a shooting direction whose difference from the calculated normal vector is the smallest as the image onto which the first three-dimensional position of the processing target is to be projected.

Next, generator 204 changes the first color information of the first three-dimensional position into the second color information indicated by the pixel value of pixel 591 identified in step S131 (S132).

Additionally, when it is detected that a plurality of first three-dimensional positions are projected onto one pixel, generator 204 may change the first color information of a first three-dimensional position that is in the position closest to the position of camera 101 at the time when the image including the pixel is shot into the second color information indicated by the pixel value of the pixel. In this case, among the above-described plurality of first three-dimensional positions, for a first three-dimensional position located in the second closest position to the position of camera 101 at the time when the image including the pixel is shot, generator 204 may select an image onto which the first three-dimensional position is to be projected from among a plurality of images of the multi-viewpoint image except for the above-described image in a manner similar to step S131. When there are third and subsequent first three-dimensional positions, selection can be performed in a similar manner.

Accordingly, the first color information of the first three-dimensional model can be changed into the second color information having higher accuracy than the first color information, by using the multi-viewpoint image whose first positional relationship with the first three-dimensional models has been identified.

Figure 15:
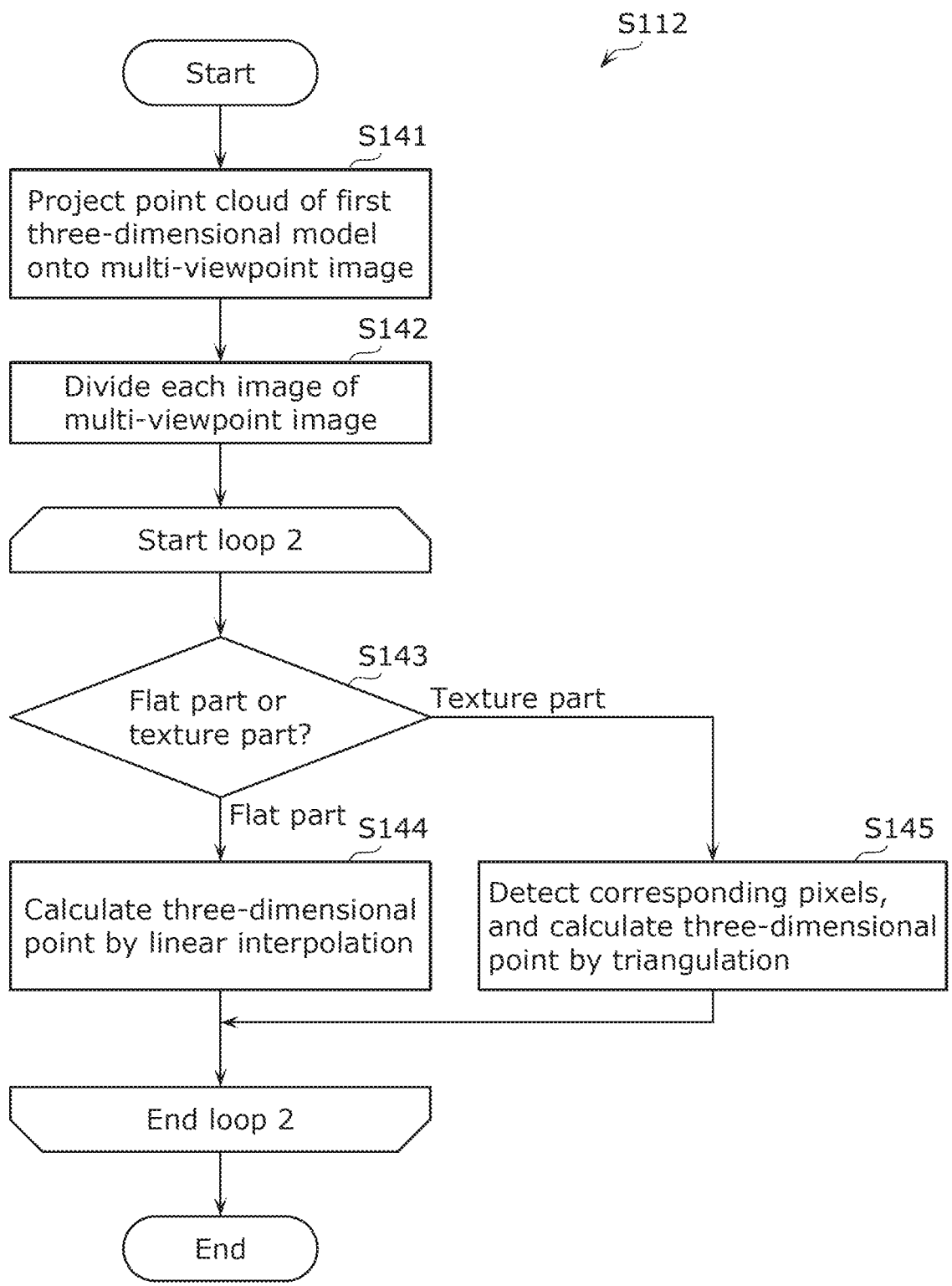
FIG. 15 is a flowchart illustrating a second method of the definition enhancing processing.
Figure 16:
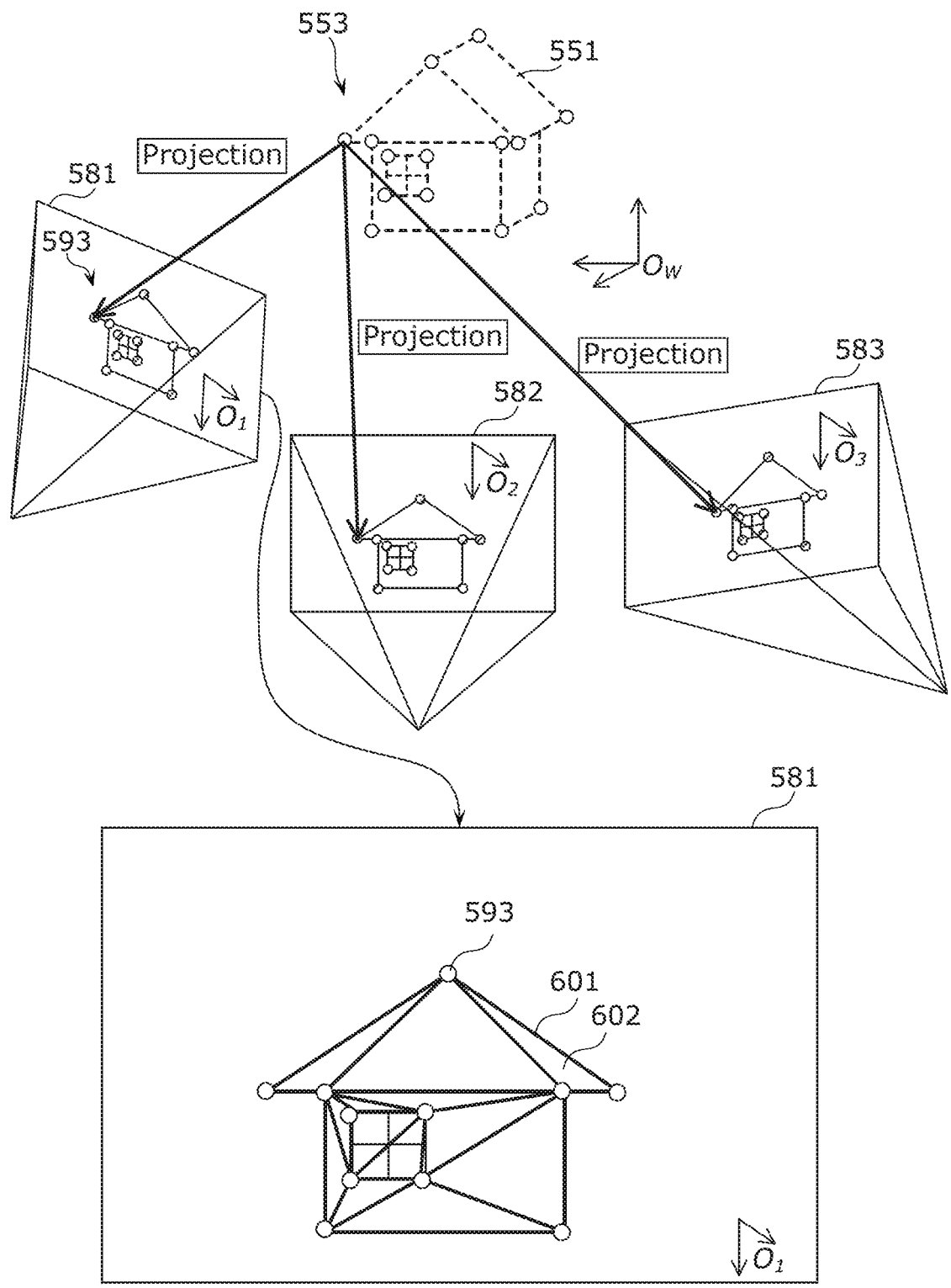
FIG. 16 is a diagram for describing the second method of the definition enhancing processing.

Next, the second method of the definition enhancing processing (S112) by generator 204 will be described by using FIG. 15 and FIG. 16. FIG. 15 is a flowchart illustrating the second method of the definition enhancing processing. FIG. 16 is a diagram for describing the second method of the definition enhancing processing.

In the second method, generator 204 interpolates a second three-dimensional position on measurement target 500 between two positions included in the plurality of first three-dimensional positions included in the first three-dimensional model, by using the first positional relationship and the multi-viewpoint image. Accordingly, generator 204 generates the second three-dimensional model that includes the plurality of first three-dimensional positions and the second interpolated three-dimensional position.

Specifically, generator 204 projects first three-dimensional point cloud 553 indicating the plurality of first three-dimensional positions included in first three-dimensional model 551 onto the plurality of images 581 to 583 of the multi-viewpoint image (S141). Generator 204 projects first three-dimensional point cloud 553 onto all of the images 581 to 583 of the multi-viewpoint image.

Next, for each of images 581 to 583 included in the multi-viewpoint image, generator 204 generates a triangle group having a plurality of pixels onto which the first three-dimensional point cloud is projected as vertices (S142). Specifically, as illustrated in FIG. 16, generator 204 generates a plurality of triangles 602 by connecting a plurality of pixels 593 on image 581 onto which first three-dimensional point cloud 553 is projected with line segments 601.

Generator 204 performs loop 2, which is a double loop for each of images 581 to 583 included in the multi-viewpoint image, and for each of triangles 602 of the triangle group generated on the image. Loop 2 includes the following steps S143 to S145.

Generator 204 calculates the texture strength inside triangle 602 of the processing target, and determines whether triangle 602 is a flat part or a texture part based on the calculated texture strength (S143).

When generator 204 determines that triangle 602 of the processing target is a flat part (flat part in S143), generator 204 linearly interpolates the inside of a triangle in a three-dimensional space defined by three first three-dimensional positions corresponding to the vertices of triangle 602 to calculate three-dimensional points inside the triangle (S144).

When generator 204 determines that triangle 602 of the processing target is a texture part (texture part in S143), generator 204 detects a similar point from the image of the multi-viewpoint image for each pixel inside triangle 602, and performs triangulation with the detected similar point, thereby calculating a three-dimensional point corresponding to the pixel (S145). The manner described by using FIG. 8 and FIG. 9 can be used for triangulation. Note that, in step S145, generator 204 may interpolate a three-dimensional position corresponding to the inside of triangle 602 of the third three-dimensional model generated by using the multi-viewpoint image.

Accordingly, a three-dimensional position between two first three-dimensional positions of the first three-dimensional model can be interpolated by using the multi-viewpoint image whose first positional relationship with the first three-dimensional model has been identified. Thus, the second three-dimensional model can be generated in which the density of the first three-dimensional model is increased.

Figure 17:
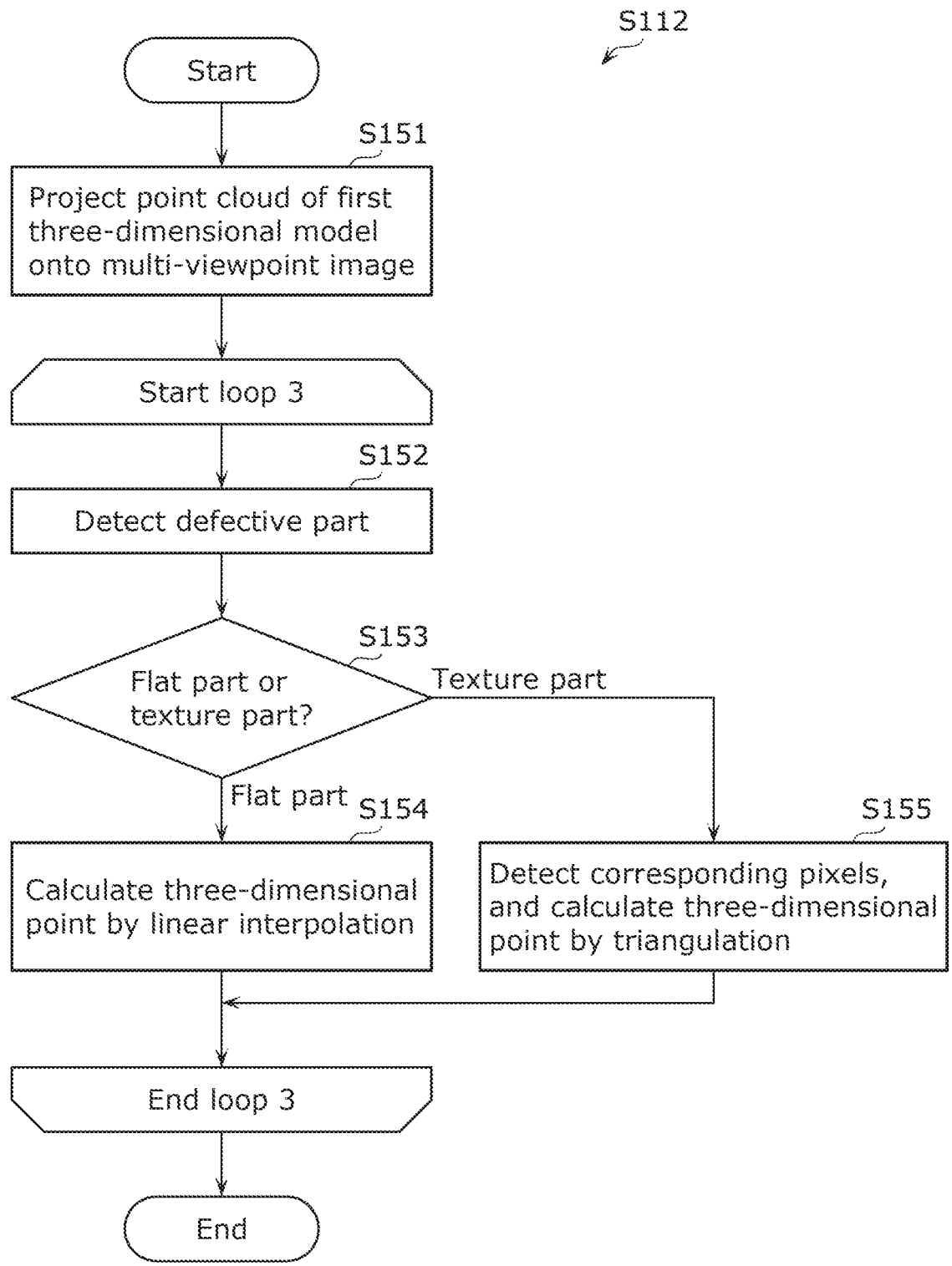
FIG. 17 is a flowchart illustrating a third method of the definition enhancing processing.
Figure 18:
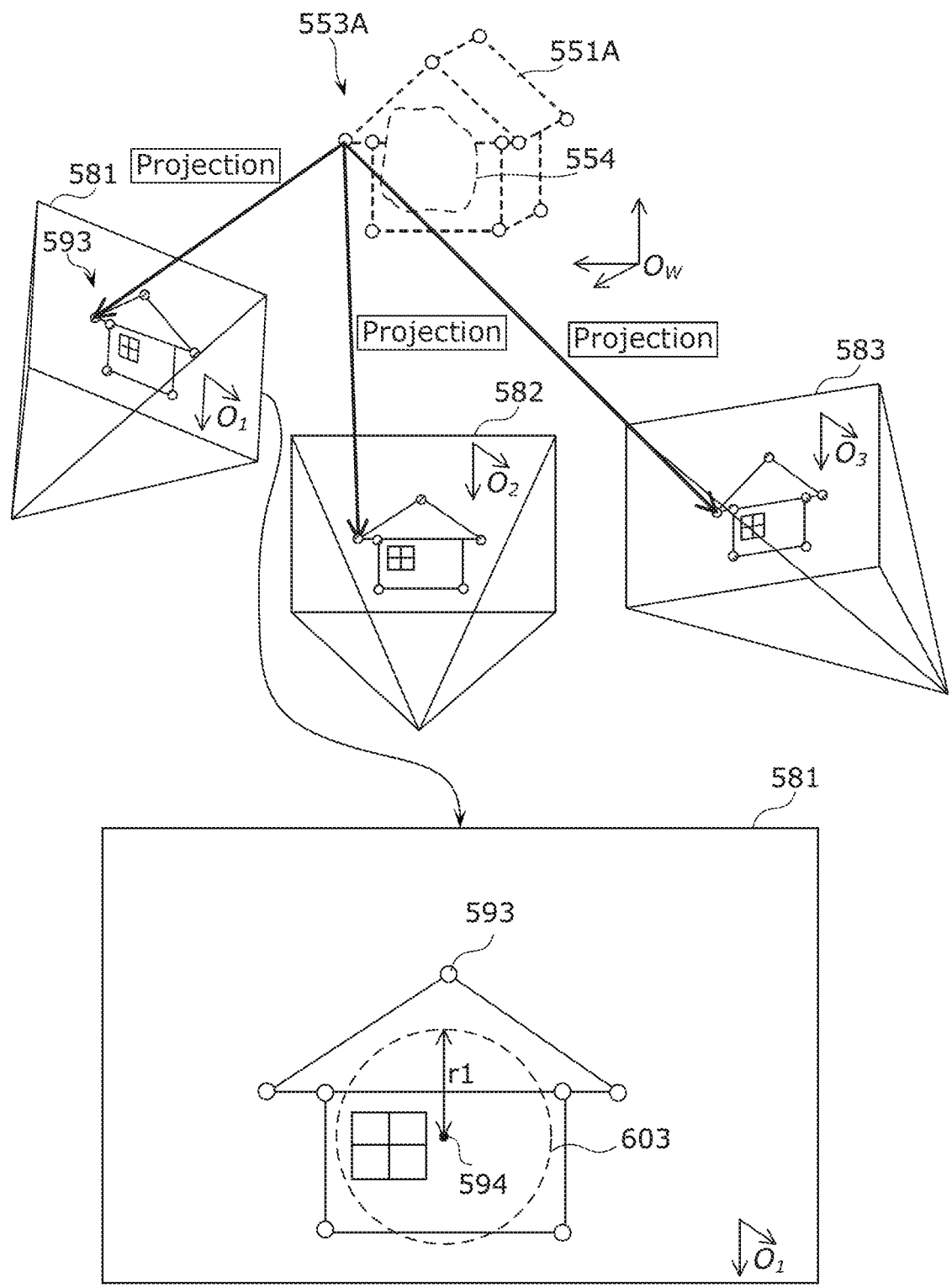
FIG. 18 is a diagram for describing the third method of the definition enhancing processing.

Next, the third method of the definition enhancing processing (S112) by generator 204 will be described by using FIG. 17 and FIG. 18. FIG. 17 is a flowchart illustrating the third method of the definition enhancing processing. FIG. 18 is a diagram for describing the third method of the definition enhancing processing.

In the third method, generator 204 detects defective part 554 of the first geometry information included in first three-dimensional model 551A, and interpolates a third three-dimensional position on measurement target 500 in the detected defective part 554, by using the first positional relationship and the multi-viewpoint image. Accordingly, generator 204 generates a second three-dimensional model including a plurality of first three-dimensional points and the interpolated third three-dimensional position.

Specifically, generator 204 projects first three-dimensional point cloud 553A indicating a plurality of first three-dimensional positions included in first three-dimensional model 551A onto images 581 to 583 of the multi-viewpoint image (S151). Generator 204 projects first three-dimensional point cloud 553A on all of images 581 to 583 of the multi-viewpoint image.

Next, generator 204 performs loop 3 including the following step S152 to step S155 for each of images 581 to 583 included in the multi-viewpoint image.

For each of a plurality of pixels constituting image 581 of the processing target, generator 204 detects defective part 554 of the first geometry information by detecting a pixel onto which the first three-dimensional point cloud is not projected in area 603 within a constant distance r1 or less from the pixel (S152). Generator 204 detects, for example, an area in the three-dimensional space corresponding to area 603 within the constant distance r1 or less from the detected pixel as defective part 554. Finally, generator 204 detects an area in the three-dimensional space corresponding to a sum area of a plurality of areas as defective part 554. Note that FIG. 18 illustrates one area 603.

Generator 204 calculates the texture strength of area 603 corresponding to defective part 554, and determines whether area 603 is a flat part or a texture part based on the calculated texture strength (S153).

When generator 204 determines that area 603 corresponding to defective part 554 is a flat part (flat part in S153), generator 204 calculates a three-dimensional point inside defective part 554 by linearly interpolating the inside of defective part 554 in the three-dimensional space defined by a plurality of first three-dimensional positions corresponding to the first three-dimensional point cloud projected around the defective part on the image of the processing target (S153).

When generator 204 determines that area 603 corresponding to defective part 554 is a texture part (texture part in S153), for each pixel inside defective part 554, generator 204 detects similar points from the other images 582 and 583 of the multi-viewpoint image, and performs triangulation with the detected similar points, thereby calculating a three-dimensional point corresponding to the pixel (S155). The manner described by using FIG. 8 and FIG. 9 can be used for triangulation. Note that, in step S155, generator 204 may interpolate a three-dimensional position corresponding to the inside of defective part 554 of the third three-dimensional models generated by using the multi-viewpoint image.

Accordingly, even when a defective part is generated in the first three-dimensional model due to occlusion or the like at the time of measurement with measuring device 100, the three-dimensional position of the defective part of the first three-dimensional model can be interpolated by using the multi-viewpoint image whose first positional relationship with the first three-dimensional model has been identified.

Advantageous Effects, Etc.

The three-dimensional model generation method according to the present disclosure is a three-dimensional model generation method executed by three-dimensional model generation device 200 as an information processing device, and includes: obtaining a first three-dimensional model from measuring device 100 that emits an electromagnetic wave and obtains a reflected wave which is the emitted electromagnetic wave reflected by measurement target 500, to thereby generate a first three-dimensional model including first position information indicating first three-dimensional positions in measurement target 500 (S101); obtaining a multi-viewpoint image generated by one or more cameras 101 shooting measurement target 500 from different positions (S101); and generating a second three-dimensional model by enhancing the definition of the first three-dimensional model using the multi-viewpoint image (S104).

According to this, the definition of at least one of the first geometry information or first color information of the first three-dimensional model including highly accurate geometry information obtained by measuring device 100 is enhanced by using the multi-viewpoint image shot by camera 101 that can be easily carried. Therefore, the accuracy of three-dimensional model generation can be improved, and the processing time for the three-dimensional model generation processing can be reduced.

Furthermore, in the three-dimensional model generation method according to the present disclosure, in the generating (S104), the second three-dimensional model is generated by: generating a third three-dimensional model using the multi-viewpoint image (S121); identifying a first positional relationship between the first three-dimensional model and the multi-viewpoint image by matching a three-dimensional coordinate axis of the first three-dimensional model and a three-dimensional coordinate axis of the third three-dimensional model (S123); and enhancing the definition of the first three-dimensional model using the first positional relationship identified and the multi-viewpoint image (S112).

Therefore, since the definition of the first three-dimensional model is enhanced by using the multi-viewpoint image whose first positional relationship with the first three-dimensional model has been identified, the definition of the first three-dimensional model can be more effectively enhanced.

(Variations)

In the foregoing embodiment, the first three-dimensional model includes first color information but is not limited to such, and the first three-dimensional model need not include the first color information. Specifically, it is sufficient that the first three-dimensional model includes first position information. In this case, in three-dimensional model generation device 200, generator 204 may generate the second three-dimensional model by adding, for each of the first three-dimensional positions indicated by the first position information, second color information as color information corresponding to the first three-dimensional position, using the first positional relationship identified in step S111 and the multi-viewpoint image. Here, the second color information is based on a pixel of the multi-viewpoint image which corresponds to the first three-dimensional position. For this reason, highly accurate color information can be added to the first three-dimensional model by using the free-viewpoint image whose first position relationship with the first three-dimensional model has been identified.

(Others)

Although the three-dimensional model generation method, etc., according to the present disclosure has been described based on the embodiments described above, the present disclosure is not limited to the foregoing embodiments.

For example, in the above embodiment and variations, the second three-dimensional model is generated by changing the first three-dimensional model. However, the second three-dimensional model may be generated by changing a third three-dimensional model generated from a multi-viewpoint image, using the first three-dimensional model. Furthermore, the second three-dimensional model may be generated based on the first three-dimensional model and the second three-dimensional model without making changes to the first three-dimensional model and the second three-dimensional model.

Furthermore, in the foregoing embodiments, each of the processing units included in the three-dimensional model generation device is described as being implemented by a CPU and a control program. For example, each of the structural components of these processing units may be configured of one or more electronic circuits. Each of the one or more electronic circuits may be a general-purpose circuit or a dedicated circuit. The one or more electronic circuits may include, for example, a semiconductor device, an integrated circuit (IC), or a large-scale integration (LSI), etc. The IC or LSI may be integrated in a single chip or several chips. Although referred to here as IC or LSI, the name may change depending on the scale of integration, and may be referred to as a system LSI, very large scale integration (VLSI), or ultra large scale integration (ULSI). Furthermore, a field programmable gate array (FPGA) that can be programmed after manufacturing of the LSI may be used for the same purpose.

Furthermore, general or specific aspects of the present disclosure may be implemented as a system, an apparatus, a method, an integrated circuit, or a computer program. Alternatively, the general or specific aspects of the present disclosure may be implemented as a non-transitory computer-readable medium, such as an optical disc, a hard disk drive (HDD), or a semiconductor memory, on which the computer program is recorded. Furthermore, the general or specific aspects of the present disclosure may be implemented as any combination of a system, an apparatus, a method, an integrated circuit, a computer program, and a medium.

The present disclosure also includes forms obtained by making various modifications to the above embodiments that can be conceived by those skilled in the art, as well as forms realized by combining structural components and functions in the embodiments, without departing from the essence of the present disclosure.

INDUSTRIAL APPLICABILITY

The present disclosure can be applied to a three-dimensional model generation device or a three-dimensional model generation system, and can be applied to, for example, figure creation, topography or building structure recognition, human activity recognition, free-viewpoint video generation, or the like.

The invention claimed is:

1. A three-dimensional model generation method executed by an information processing device, the three-dimensional model generation method comprising:
   obtaining a first three-dimensional model generated by a measuring device that emits an electromagnetic wave and obtains a reflected wave which is the electromagnetic wave reflected by a measurement target, the first three-dimensional model including first position information indicating first three-dimensional positions in the measurement target;
   obtaining a multi-viewpoint image generated by one or more cameras shooting the measurement target from different positions; and
   generating a second three-dimensional model of the measurement target based on the multi-viewpoint image and the first three-dimensional model by enhancing color definition of the first three-dimensional model using the multi-viewpoint image, the second three-dimensional model having an increased amount of color information per unit area relative to the first three-dimensional model.

2. The three-dimensional model generation method according to claim 1, wherein
   in the generating, a positional relationship between the multi-viewpoint image and the first three-dimensional model in a three-dimensional coordinate system is identified, and the second three-dimensional model is generated based on the positional relationship between the multi-viewpoint image and the first three-dimensional model.

3. The three-dimensional model generation method according to claim 1, wherein
   the first three-dimensional model includes color information indicating color of the measurement target, and
   the enhancing of the color definition is enhancing definition of the color information included in the first three-dimensional model using the multi-viewpoint image.

4. The three-dimensional model generation method according to claim 1, wherein
   in the generating, the second three-dimensional model is generated by:
      generating a third three-dimensional model using the multi-viewpoint image;
      identifying a first positional relationship between the first three-dimensional model and the multi-viewpoint image by matching a three-dimensional coordinate axis of the first three-dimensional model and a three-dimensional coordinate axis of the third three-dimensional model; and
      enhancing the color definition of the first three-dimensional model using the first positional relationship identified and the multi-viewpoint image.

5. The three-dimensional model generation method according to claim 4, wherein in the generating, the second three-dimensional model is generated by adding, for each of the first three-dimensional positions, second color information as color information corresponding to the first three-dimensional position, using the first positional relationship and the multi-viewpoint image, the second color information being based on a pixel of the multi-viewpoint image which corresponds to the first three-dimensional position.

6. The three-dimensional model generation method according to claim 4, wherein
the first three-dimensional model further includes items of first color information each indicating a color of the measurement target in a different one of the first three-dimensional positions, the first color information being generated using an image of the measurement target shot by the measuring device,
each of images included in the multi-viewpoint image is an image having a resolution higher than a resolution of the image shot by the measuring device, and
in the generating, the second three-dimensional model is generated by changing, for each of the first three-dimensional positions, the item of first color information corresponding to the first three-dimensional position to an item of second color information which is based on a pixel of the multi-viewpoint image which corresponds to the first three-dimensional position, using the first positional relationship and the multi-viewpoint image.

7. The three-dimensional model generation method according to claim 4, wherein
in the generating, the second three-dimensional model is generated by interpolating, using the first positional relationship and the multi-viewpoint image, a second three-dimensional position which is between two or more positions included in the first three-dimensional positions in the measurement target, the second three-dimensional model including the first three-dimensional positions and the second three-dimensional position interpolated.

8. The three-dimensional model generation method according to claim 4, wherein
in the generating, the second three-dimensional model is generated by detecting a defective portion of the first position information and interpolating a third three-dimensional position in the measurement target corresponding to the defective portion interpolated, using the first positional relationship and the multi-viewpoint image, the second three-dimensional model including the first three-dimensional positions and the third three-dimensional position interpolated.

9. The three-dimensional model generation method according to claim 1, further comprising:
obtaining (i) an identified image for which a second positional relationship with the first three-dimensional model is identified and (ii) the second positional relationship, wherein in the generating, the second three-dimensional model is generated by:
generating a third three-dimensional model using the multi-viewpoint image and the identified image;
identifying a first positional relationship between the first three-dimensional model and the multi-viewpoint image, using the third three-dimensional model and the second positional relationship; and
enhancing the color definition of the first three-dimensional model using the first positional relationship identified and the multi-viewpoint image.

10. An information processing device comprising:
a receiver configured to receive:
a first three-dimensional model generated by a measuring device that emits an electromagnetic wave and obtains a reflected wave which is the electromagnetic wave reflected by a measurement target, the first three-dimensional model including first position information indicating first three-dimensional positions in the measurement target; and
a multi-viewpoint image generated by one or more cameras shooting the measurement target from different positions; and
a processor configured to generate a second three-dimensional model of the measurement target based on the multi-viewpoint image and the first three-dimensional model by enhancing color definition of the first three-dimensional model using the multi-viewpoint image, the second three-dimensional model having an increased amount of color information per unit area relative to the first three-dimensional model.

11. A non-transitory computer-readable medium having recorded thereon a program for causing a computer to execute a three-dimensional model generation method, wherein
the three-dimensional model generation method includes:
obtaining a first three-dimensional model generated by a measuring device that emits an electromagnetic wave and obtains a reflected wave which is the electromagnetic wave reflected by a measurement target, the first three-dimensional model including first position information indicating first three-dimensional positions in the measurement target;
obtaining a multi-viewpoint image generated by one or more cameras shooting the measurement target from different positions; and
generating a second three-dimensional model of the measurement target based on the multi-viewpoint image and the first three-dimensional model by enhancing color definition of the first three-dimensional model using the multi-viewpoint image, the second three-dimensional model having an increased amount of color information per unit area relative to the first three-dimensional model.

* * * * *